(12) United States Patent
Veyseh et al.

(10) Patent No.: US 11,601,710 B2
(45) Date of Patent: Mar. 7, 2023

(54) SELF INTERFERENCE CANCELLATION FOR HIGH PERFORMANCE TRANSCEIVERS

(71) Applicant: SiTune Corporation, San Jose, CA (US)

(72) Inventors: Marzieh Veyseh, Los Altos, CA (US); Mahdi Khoshgard, Los Gatos, CA (US); Vahid M Toosi, Los Altos, CA (US); Saeid Mehrmanesh, San Jose, CA (US)

(73) Assignee: SiTune Corporation, San Jose, CA (US)

(*) Notice: Subject to any disclaimer, the term of this patent is extended or adjusted under 35 U.S.C. 154(b) by 278 days.

(21) Appl. No.: 16/838,835

(22) Filed: Apr. 2, 2020

(65) Prior Publication Data

US 2021/0314649 A1 Oct. 7, 2021

(51) Int. Cl.
*H04N 21/437* (2011.01)
*H04N 21/239* (2011.01)
*H04N 21/61* (2011.01)

(52) U.S. Cl.
CPC ......... *H04N 21/437* (2013.01); *H04N 21/239* (2013.01); *H04N 21/6118* (2013.01); *H04N 21/6168* (2013.01)

(58) Field of Classification Search
CPC ............... H04N 21/239; H04N 21/437; H04N 21/6118; H04N 21/6168

USPC ........................................................ 725/111
See application file for complete search history.

(56) References Cited

U.S. PATENT DOCUMENTS

| 6,707,912 B2* | 3/2004 | Stephens | H04M 9/082 |
| | | | 379/406.01 |
| 2016/0036490 A1* | 2/2016 | Wu | H04B 3/32 |
| | | | 375/257 |
| 2019/0044555 A1* | 2/2019 | Hewavithana | H04B 3/20 |

* cited by examiner

*Primary Examiner* — An Son P Huynh
*Assistant Examiner* — Jaycee Imperial
(74) *Attorney, Agent, or Firm* — Platinum Intellectual Property LLP

(57) ABSTRACT

Approaches provide for processing a communications signal, such as a wideband communications signal. For example, a communications signal can be received at an access device, such as a cable modem or a wireless transceiver/radio. The access device can include components operable to process the communications signal to enable access to, for example, video, data, voice, high-speed Internet services. At least some of the components include an echo cancellation component among other components to cancel interference (e.g., ACI, ALI). For example, the echo cancellation component can use trained filters and samples of the upstream signal, echoed samples of the transmitted signal, feedback signals of the echoed signal, etc., to estimate one or more types of interference. Thereafter, the estimated interference can be used to cancel interference at the access device.

17 Claims, 14 Drawing Sheets

SELF INTERFERENCE CANCELLATION FOR HIGH PERFORMANCE TRANSCEIVERS

BACKGROUND

With high bandwidth applications (e.g., full band cable and satellite receivers, serial links and short-range wireless communications) becoming more and more popular, cable television (CATV) systems are providing media content, such as video, data, voice, high-speed Internet services, etc., to subscribers. The CATV system may deliver the media content from a headend to subscriber's client devices over an existing cable television network. The cable television network can take the form of an all-coax, all-fiber, or hybrid fiber/coax (HFC) network. To keep pace with increasing customer demands for media content and the corresponding explosion in demands for bandwidth, the cable industry is contemplating adding bidirectional high-speed data services to cable networks to supplement/upgrade existing DOCSIS systems. Such an approach aims to increase the bandwidth available for upstream and downstream communications. However, conventional approaches require high transmission powers, which is problematic for home-based modems. Further, the signal distortion and operational costs of long chains of electrical amplifiers can become costly and problematic. What is needed is a low power consumption approach to transmit content for high bandwidth applications.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Systems and methods in accordance with various embodiments of the present disclosure may overcome one or more of the aforementioned and other deficiencies experienced in conventional approaches to processing communications signals. In particular, various embodiments describe systems and methods for processing wideband communications signals at an access device, such as a cable modem or other such device while minimizing interference (e.g., ACI, ALI). For example, a communications signal (e.g., wideband signal) can be received at an access device, such as a cable modem, set-top box, hardened modem in an outdoor monitoring station, remote-PHY, wireless modems, wireless base stations, or another appropriate device or customer premise equipment. The device can be located at, for example, a subscriber's home or business, or at Remote-PHY, or another appropriate location. The subscriber, for example, can be a consumer of high bandwidth applications provided via one or more network providers that enable access to media content, such as video, data, voice, high-speed Internet services, etc.

The access device can include components operable to process the communications signal to enable access to, for example, video, data, voice, high-speed Internet services. At least some of the components include, for example, an echo cancellation component among other components to cancel interference. The echo cancellation component uses trained filters (e.g., ACI and ALI filters) and samples of the digital transmitted upstream (US) signal, echoed samples of the transmitted signal, feedback signals of the echoed signal, etc., to estimate ACI and ALI. The digital ACI signal is converted into an analog signal and subtracted from the received downstream (DS) signal. The digital ALI signal is used at the receiver demodulator to subtract leakage as co-channel noise from received DS samples.

Figure 1:
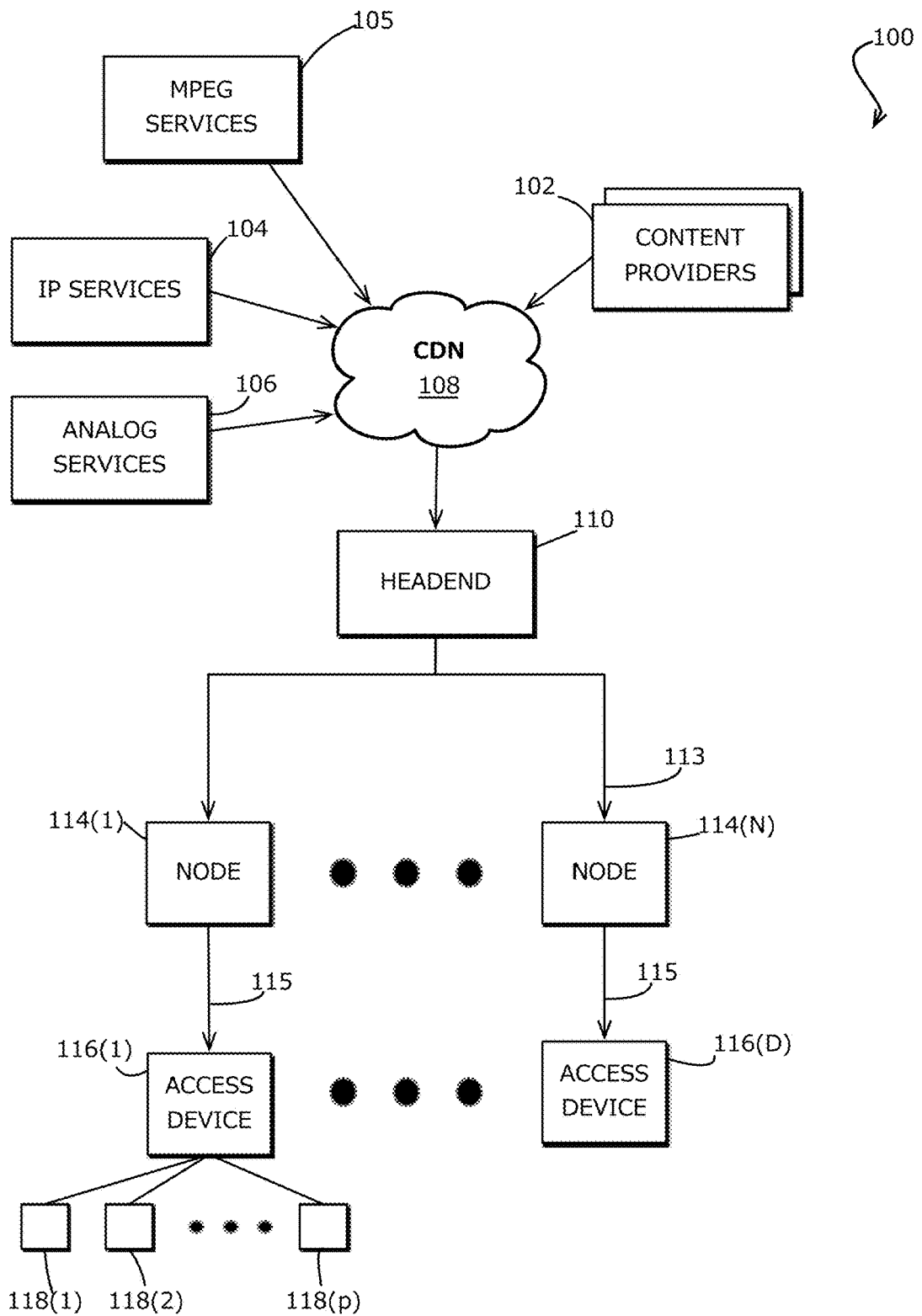
FIG. 1 illustrates a block diagram of a network provider environment capable of delivering high-bandwidth content that can be utilized in accordance with various embodiments.

Advantageously, network providers, for example, cable providers, can provide high bandwidth services while minimizing interference, and thus, optimizing receiver performance of access devices that enable subscribers to access such services. Various other functions and advantages are described and suggested below as may be provided in accordance with the various embodiments FIG. 1 illustrates a block diagram of example network provider environment 100 in which aspects of the various embodiments can be implemented. It should be understood that reference numbers are carried over between figures for similar components for purposes of simplicity of explanation, but such usage should not be construed as a limitation on the various embodiments unless otherwise stated. In this example, a user (e.g., subscriber) can utilize an access device 116(1)-(D) to communicate across content delivery network 108 in network provider environment 100.

Network provider environment 100 includes headend 110, a plurality of nodes 114(1)-(N), and a plurality of access devices 116(1)-116(D). Users (e.g., subscribers) can connect to one or more services via client devices 118(1)-118(p). Network provider environment 100 can be provided by a network provider. A network provider can enable access to, for example, media content such as video, data, voice, high-speed Internet services, etc., for example, to subscribers.

Network provider environment 100 can take the form of an all-coax, all-fiber, or hybrid fiber/coax (HFC) network. As shown in FIG. 1, network provider environment 100 depicts an HFC network. An HFC network is a broadband network that combines optical fiber and coaxial cable, strategically placing nodes to provide services to a plurality of homes. It should be noted that techniques disclosed herein may be employed in various networks, and the HFC network is shown as a non-limiting example.

A typical HFC network uses optical fiber for communications between the headend (e.g., headend 110) and the nodes (e.g., nodes 114(1)-114(N)) and coaxial cable for communications between the nodes and the end user network elements (e.g., access devices 116(1)-116(D)). Downstream (also referred to as forward path) optical communications over the optical fiber are typically converted at the nodes to RF communications for transmission over the coaxial cable. Conversely, upstream (also referred to as return path) RF communications from the network elements are provided over the coaxial cables and are typically converted at the nodes to optical communications for transmission over the optical fiber. Accordingly, in accordance with various embodiments, a transmission from an information server toward an end user is referred to as downstream and a transmission toward the server is referred to as upstream.

Network provider environment 100 enables for one or more of commercial TV services, Internet data services, and voice services, e.g., Voice-over-Internet Protocol (VoIP) to be provided to one or more end users (e.g., subscribers) via an access device for a given geographic area. To provide these services, headend 110, in an embodiment, is shown coupled to content delivery network 108 to a plurality of content providers 102, IP services 104, MPEG services 105, analog services 106.

It should be noted that other services are contemplated by the embodiments described herein. Such services may include, for example, analog services and other such services. Content providers 102 may be, for example, the source of media content (e.g., movies, television channels, etc.) IP services 104 can include, for example, video-on-demand, audio-on-demand, and pay-per-view streams provided via an IP network. A web server and a data source may be utilized to deliver the streams. The web server can be a streaming server that uses IP to provide video-on-demand, audio-on-demand, and pay-per-view streams. The data source may be connected to a regional area or backbone network that transmits Internet Protocol. For example, the regional area network can be or include the Internet or an IP-based network, a computer network, a web-based network or other suitable wired or wireless network or network system. MPEG services 105 allow for the transmission and storage of audio, video, and Program and System Information Protocol (PSIP) data and can be used in broadcast systems such as DVB, ATSC, and IPTV.

Headend 110 may include a cable modem termination system (CMTS), transmitter, and receiver (not shown). In general, the CMTS is a component located at the headend or hub site of the network that exchanges signals between the headend and access devices within the cable network infrastructure. In an example DOCSIS arrangement, for instance, the CMTS and the access devices may be the endpoints of the DOCSIS protocol, with the hybrid fiber coax (HFC) cable plant therebetween.

At the headend, the various services can be encoded, modulated and up-converted onto radio frequency (RF) carriers, combined onto a single electrical signal, and inserted into the transmitter. For example, a transmitter at headend 110 can convert the electrical signal to a downstream optically modulated signal that is sent to nodes 114(1)-114(N). Nodes 114(1)-114(N) convert inbound (forward) optical signals to Radio Frequency (RF) energy for access devices 116(1)-116(D). In the return path, nodes 114(1)-114(N) convert return RF signals to optical signals, and send the optical signals through communications network 113 to the return receiver of headend 110, which can convert the optical signals back to electrical signals. In one example, a node is a local digital hub that transports local requests over communications network 113 and back to, for example, a customer home via the coaxial cables.

Communications network 113, for example, a fiber optic network, can extend from a master/regional headend to nodes 114(1)-(N). Regional headends (e.g., headend 110) and/or neighborhood hub sites (e.g., 112(1)-(M)) may also exist between the headend and one or more nodes.

Content delivery network 108 may be a cable data network such as an all coaxial or a hybrid-fiber/coax (HFC) network or other broadband access network such as xDSL (e.g., ADSL, ADLS2, ADSL2+, VDSL, and VDSL2) and satellite systems. Examples of content delivery networks include networks including, for example, managed origin and edge servers or edge cache/streaming servers.

Content delivery network 108 can deliver content via one or more wired and/or wireless telecommunication networks using content delivery servers to access devices. For example, content delivery network 108 includes communication links connecting content delivery network 108 to one or more client devices, e.g., for exchanging data with and delivering content downstream to the connected client devices 118(1)-118(p). The communication links may include, for example, a transmission medium such as an optical fiber, a coaxial cable, or other suitable transmission media, transmission line, or wireless telecommunications.

Each of the nodes 114(1)-114(N) can include one or more corresponding access points, shown in FIG. 1 as access devices 116(1)-(D). In an embodiment, a single node may be connected to thousands of network elements, e.g., cable modems. In an example, node 114(1) serves anywhere from 1 to 2500 customer locations. In an HFC network, nodes 114(1)-114(N) may be connected to a plurality of access devices 116(1)-116(D) via a coaxial cable portion 115 or a combined fiber optic/coaxial cable portion 115 of the network. In an embodiment, nodes 114(1)-114(N) may include a broadband optical receiver to convert the downstream optically modulated signal received from the headend/hub to an electrical signal provided to access devices 116(1)-116 (D) via coaxial portion 115 of the HFC network. Signals may pass from nodes 114(1)-114(N) to access devices 116(1)-116(D) via one or more amplifiers and active or passive devices including cabling, taps, splitters, and in-line equalizers (not shown). The amplifiers can be used to amplify signals communicated to access devices 116(1)-116 (D).

Access devices 116(1)-116(D) are a type of receiving device and can include any appropriate electronic device operable to facilitate network communications over an appropriate network. Access devices 116(1)-116(D) may perform the functions of a set top box, a cable modem, a cable telephone, a hardened modem in an outdoor monitoring station, a remote-PHY, a wireless modem, a wireless base station, or some other device. Access devices 116(1)-116(D) may be placed, deployed, or otherwise installed in a home, a business, a remote-PHY, or some other environment, and any number of such devices may be located in the environment. Although approaches described herein may relate to access devices 116(1)-116(D), it should be understood that an access device is used by way of example, as the concepts apply to other network elements. Examples of network elements include cable modems, set-top boxes, televisions equipped with set-top boxes, data over cable service interface specification (DOCSIS) terminal devices, media terminal adapters (MTA), and the like. Thus, where reference is made to an access device, the concepts also apply more broadly to a network element. In an example, the network element corresponds to a cable modem at a customer's premises for receipt of modulated signals from the headend 110.

In an embodiment, a cable modem is, e.g., a type of network bridge and modem that provides bi-directional data communication via radio frequency channels on a cable network, such as a hybrid fiber-coaxial plant (HFC) or RFoG infrastructure. For example, a cable modem can be added to or integrated with a set-top box that provides a TV set with channels for Internet access. In certain embodiments, the cable modem can be integrated in a TV set or other network device. Cable modems may deliver broadband Internet access in the form of cable Internet, taking advantage of the high bandwidth of an HFC or RFoG network. Cable modems can also provide video services using Internet Protocol (IP). For example, a cable modem may be connected to IPTV receivers or other items of customer premises equipment. A customer PC or laptop as well as other associated devices such as tablets, smartphones, or home routers are termed customer premises equipment (CPE).

Access devices 116(1)-116(D) may be coupled to headend 110 via a wired medium (e.g., a coaxial cable, fiber optic cable, or the like), a wireless medium (e.g., a standardized or ad hoc radio frequency (RF) protocol), or a combination of wired and wireless media. In some embodiments, for example, access devices 116(1)-116(D) are coupled to an over-the-air antenna, a satellite reception device (e.g., a dish), or a cable system that delivers programming to access devices 116(1)-116(D) via a coaxial cable.

Access devices 116(1)-116(D) can further be coupled to one or more output client devices 118(1)-118(p) such as a video display, an audio subsystem, a recording device, and the like. In accordance with various embodiments, client devices can include personal computers, tablet computers, smartphones, notebook computers, smart devices (e.g., watches, glasses, etc.), and the like. Client devices 118(1)-118(p) can communicate with an access device via wired media, wireless media, or wired and wireless media that conforms to one or more standardized or non-standardized protocols (e.g., high-definition multimedia interface (HDMI), DISPLAYPORT, digital visual interface (DVI), and the like). In certain embodiments, client devices 118 (1)-118(p) may be fully or partially integrated with the access devices or the client devices 118(1)-118(p) may be separate and distinct from access devices. In certain embodiments, access devices 116(1)-116(D) operate as a duplex device. For example, access devices 116(1)-116(D) communicate information from headend 110 to access devices 116(1)-116(D) and from access devices 116(1)-116(D) to headend 110. Data, such as programming data that is communicated from headend 110 to access devices 116(1)-116 (D) is discussed herein as downstream data. Data, such as control data, which is communicated from access devices 116(1)-116(D) to headend 110, is discussed herein as upstream data. One or both of the downstream data and the upstream data may be bi-directional.

Access devices 116(1)-116(D) may communicate in conformance with a Data Over Cable Service Interface Specifications (DOCSIS) standard, such as the DOCSIS standard of Cable Television Laboratories, Inc. (i.e., CableLabs), the International Telecommunication Union (ITU), Europe, or the Multimedia Cable Network System Partners (MCNS). Access device 116 may conform to one or more other standards. In an embodiment, DOCSIS is an international telecommunications standard that permits the addition of high-speed data transfer to existing cable television (CATV) network, such as network provider environment 100. The DOCSIS protocol is the protocol used to send digital video and data between a hub or headend facility and cable modem. DOCSIS is used to convey Internet or other packet-based networking information, as well as packetized digital video between CMTSs and CMs. DOCSIS is employed by many cable operators to provide Internet access over their existing network infrastructures, e.g., hybrid fiber-coaxial (HFC) infrastructure, PON architectures, etc. While embodiments are disclosed with reference to DOCSIS, the load balancing implementations may apply to other networks or systems.

Figure 2A:
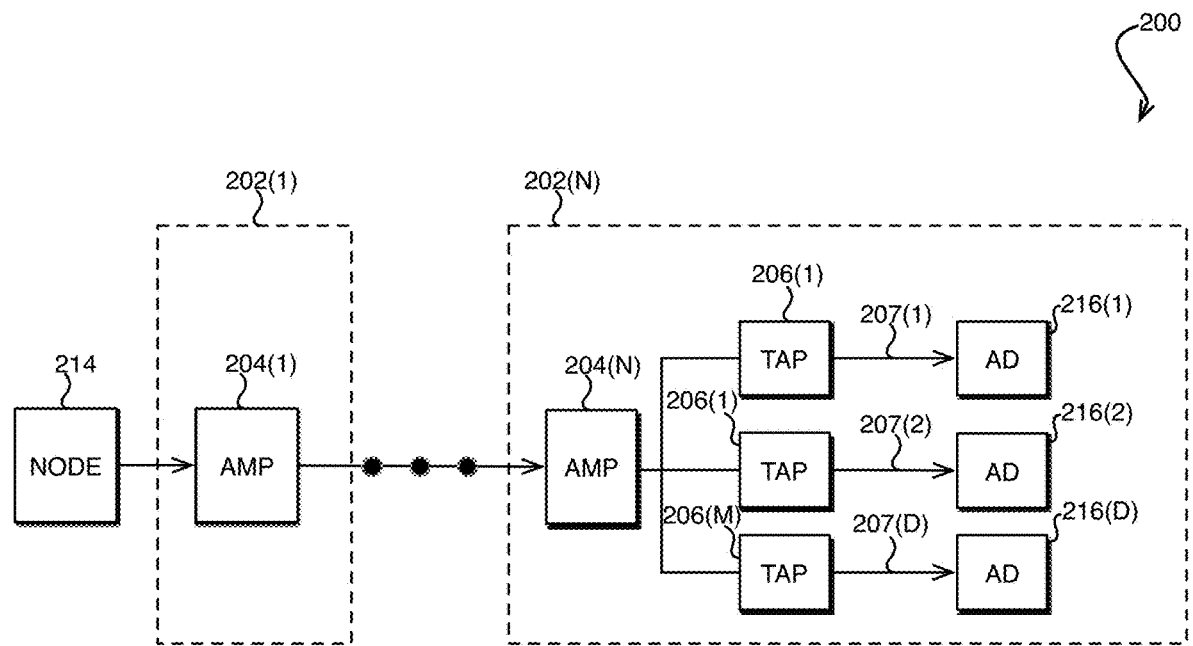
FIG. 2A illustrates an example network architecture using frequency division duplex (FDD) in accordance with an embodiment.

As described, there is a demand for bidirectional high-speed data services for different client devices across various networks. Such devices can include, for example, mobile phones, tablets, smart locks, home appliances, security devices, smart infrastructure (e.g., city lights, traffic monitoring systems, etc.) and the like. Conventional network architecture fails to provide optimal access to spectrum. For example, FIG. 2A illustrates an example of a conventional hybrid fiber/coax (HFC) cable distribution network architecture 200 in accordance with an embodiment. In this example, network architecture 200 includes a coax branch of a conventional Node+N HFC architecture. The node span includes node 214 connecting multiple cascaded amplifiers sections 202(1)-(N). Each section connects to a series of multiport taps transmitting signals to and receiving signals from drop cables to customer premise equipment (e.g., an access device such as a cable modem). For example, amplifier section 202(N) includes amplifier 204(N) coupled to a set of taps 206(1)-(M). Taps 206(1)-(M) are coupled to access devices 216(1)-(D) via drop cables 207(1)-(M). Tap 206(1) is coupled to access device 216(1) via drop cable 207(1).

Amplifier sections 202(1)-(N) use diplex filtering to separate upstream transmissions toward node 214 in the narrower lower frequency band (e.g., 85 MHz or less) from downstream transmissions from node 214 in the wider upper frequency band (e.g., up to 1 GHz). Such diplex filtering attempts to prevent or at least reduces two-way transmission within the same bandwidth. For example, each multiport tap (e.g., multipart taps 206(1)-(M)) includes a directional coupler that diverts a portion of the downstream signal to the drops (e.g., access devices) connected to the tap ports and injects the upstream signals present on the tap ports toward node 214. The directivity of the directional coupler helps to prevent upstream signals from propagating in the downstream direction or from diverting to other drops upstream from that tap port. Access devices on the same tap in this situation can either transmit or receive in a given channel, but not simultaneously. However, if the transmitting and receiving access devices are separated across different taps, then simultaneous transmission by one access device and reception by another access device on a different tap with sufficient separation to provide isolation between the signals sharing the same frequencies in a given channel is possible.

Figure 2B:
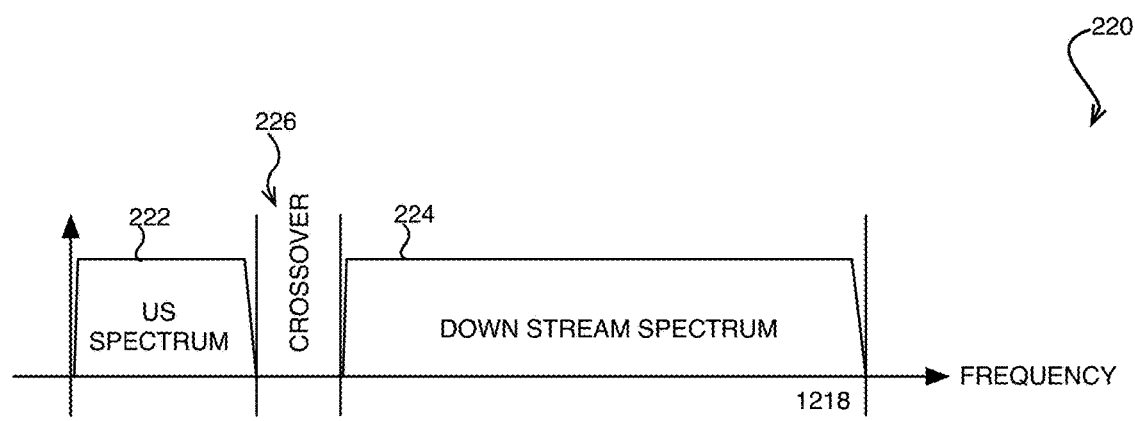
FIG. 2B illustrates an example frequency spectrum in accordance with FDD architecture in accordance with an embodiment.

For example, FIG. 2B illustrates example 220 of dividing the frequency in accordance with FDD. As shown in FIG. 2B, the usable frequency spectrum is divided into non-overlapping downstream (DS) 222 and upstream (US) spectrums 224 and a crossover spectrum 226.

Figure 2C:
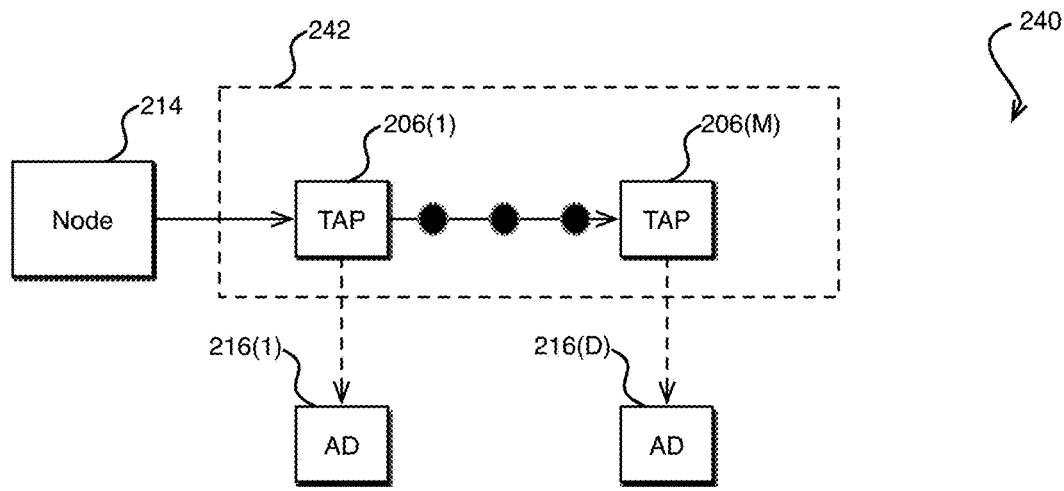
FIG. 2C illustrates an example network architecture using full duplex (FDX) in accordance with an embodiment.

As described, there is a demand for bidirectional high-speed data services for different client devices across various networks. FIG. 2C illustrates a full duplex (FDX) network architecture 240 that can be utilized to increase bandwidth in accordance with various embodiments. In this example, FDX network architecture 240 can provide two-way signal transmission within the same spectral band. As shown, node 214 is coupled to a single series of multiport taps 242. Multiport taps 206(1)-(M) are arranged in a single series. Unlike network architecture 200, FDX network architecture 240 does not include amplifiers that require diplex filtering. As such, both upstream and downstream signals can share the part of the same spectrum but with the same directivity of the network architecture 200. As a result, the bandwidth supported in FDX network architecture 240 can be wider than network architecture 200.

Figure 2D:
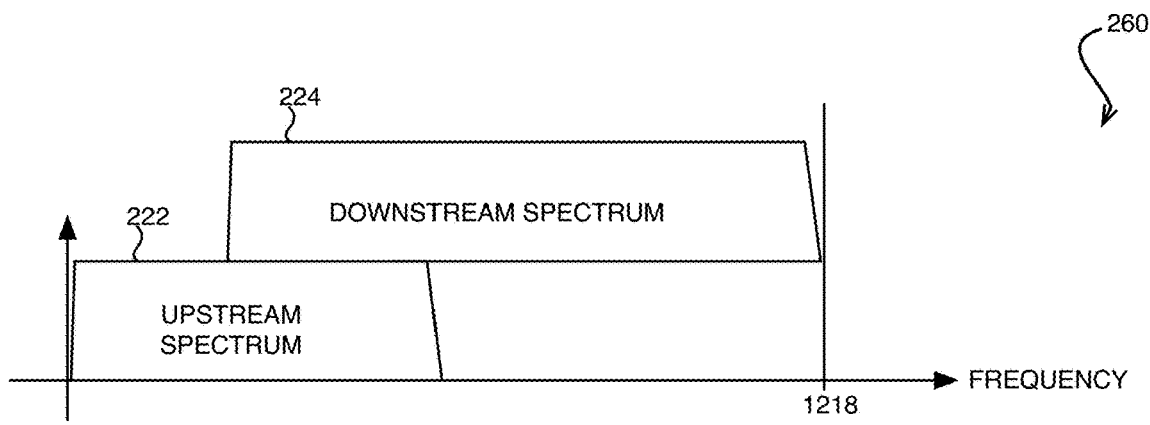
FIG. 2D illustrates an example frequency spectrum in accordance with FDX architecture in accordance with an embodiment.

For example, FIG. 2D illustrates example 260 of sharing frequency when FDX network architecture 240 is utilized in accordance with various embodiments. In this example, the usable frequency spectrum is divided between overlapping downstream (DS) spectrum 224 and upstream (US) 222. Unlike FDX network architecture 240 of FIG. 2B, there is no crossover spectrum in example 260 of FIG. 2D, as the DS and US spectrums can use the same spectrum at the same time, resulting in at least doubling the spectrum usage efficiency. The overlapping DS and US spectrum advantageously allows for additional frequency spectrum for US traffic without sacrificing the frequency spectrum for DS traffic. For example, conventional coaxial network has approximately 1.2 GHz of usable spectrum (limited by the attenuation of the taps installed in the field, which have a sharp roll off around 1.2 GHz). Given the fixed 1.2 GHz of usable spectrum in the coaxial network, increasing the US spectrum reduces the DS spectrum when FDD is used. Embodiments in accordance with FDX DOCSIS allows DS and US traffic to overlap on frequencies, effectively doubling the usable spectrum of the coaxial network to 2.4 GHz.

However, FDX simultaneous transmission and reception within the same spectrum introduces interference into and reflections back toward the transmission source that should be effectively canceled or at least substantially reduced (e.g., reduced a threshold amount) for simultaneous reception of signals traveling in the opposite direction within the same frequency band. The interference can include, for example, adjacent channel interference (ACI), adjacent leakage interference (ALI), among other such interferences.

Figure 2E:
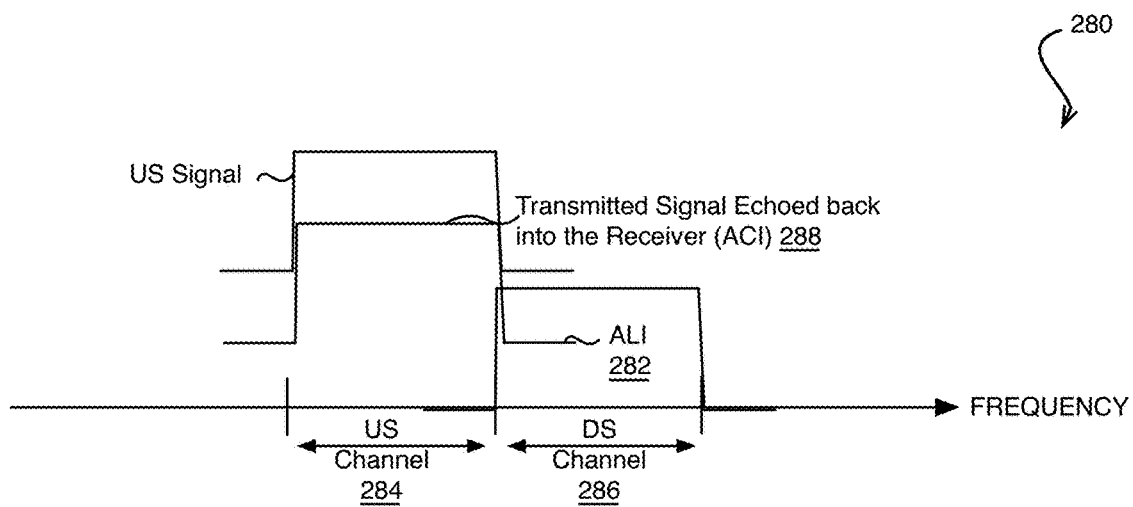
FIG. 2E illustrates example adjacent channel interference (ACI) and adjacent leakage interference (ALI) in accordance with an embodiment.

FIG. 2E illustrates example 280 of interference at an access device (e.g., cable modem) in accordance with various embodiments. Adjacent channel interference (ACI) 288 occurs when a device transmits on one channel (e.g., US channel 284) and receives on an adjacent channel (e.g., DS channel 286). The power of the transmitting channel echoed/reflected back to the receiver and added to the original degraded signal due to directional coupler causes overload/saturation of the receiver front end. The theoretical base for echo cancellation is that all the echoes are true delayed degraded copies of a reference signal. The echoes can be expressed by the reference with coefficients in a linear space. The core algorithm of the echo cancellation is to find these coefficients (training for the filter coefficients). In an example, the access device upstream echo power in the adjacent channels to the downstream receive channel is approximately 20 dB higher than the received downstream signal both measured at the access device port. This echo power, although not in the downstream received band, is a significant adjacent channel interference source that may impair the operation of the downstream receiver. The high level upstream transmitted signal in the 40 to 50 dBmV/6.4 MHz range will contribute self-adjacent leakage interference due to the limited output-to-tap isolation of the directional coupler.

Another example of interference is co-channel interference or adjacent leakage interference (ALI) 282. Co-channel interference or ALI occurs when a device transmits on one channel (e.g., US channel 284) and receives on an adjacent channel (e.g., DS channel 286). In this example, the out-of-band spurious emission of the transmitting channel (e.g., US channel 284) leaks into the receiving channel (e.g., DS channel 286) while its delayed reflections will be added to the original leakage that experienced loss due to directional coupler's characteristics. This causes degradation of the received signal quality. Although transmission and reception are dynamically separated within different channels in an access device, two sources of in-band interference can still corrupt the reception of the downstream signal in a transmitting access device. The first is isolation leakage of self-adjacent channel interference from the upstream high-power transmitted signal (i.e., self-ALI from transmitter out-of-band spurious emissions) across the directional coupler output port into the tap port where the downstream signal is received. The second is the echo of this self-ALI returning from the cable plant through the access device port and into the received signal path through the directional coupler tap port.

Accordingly, approaches describe methods and systems to cancel or at least reduce interference (e.g., ACI, ALI) so that a cable modem or other appropriate device such as wireless radios in a wireless medium can digitize and demodulate a received communications signal to a threshold level of satisfaction. As will be described further herein, for ACI cancellation, samples of the US signal are passed through an ACI filter in the digital domain. The digital signal is converted into an analog signal and subtracted from DS signal prior to a DS automatic gain control amplifier (AGC) or another appropriate component. For ALI cancellation, digital cancellation includes sampling analog feedback of the echoed US Signal to calculate the leakage, including its reflections. The feedback path utilizes ACI cancellation as well to assure accurate estimation of the leakage.

Figure 3:
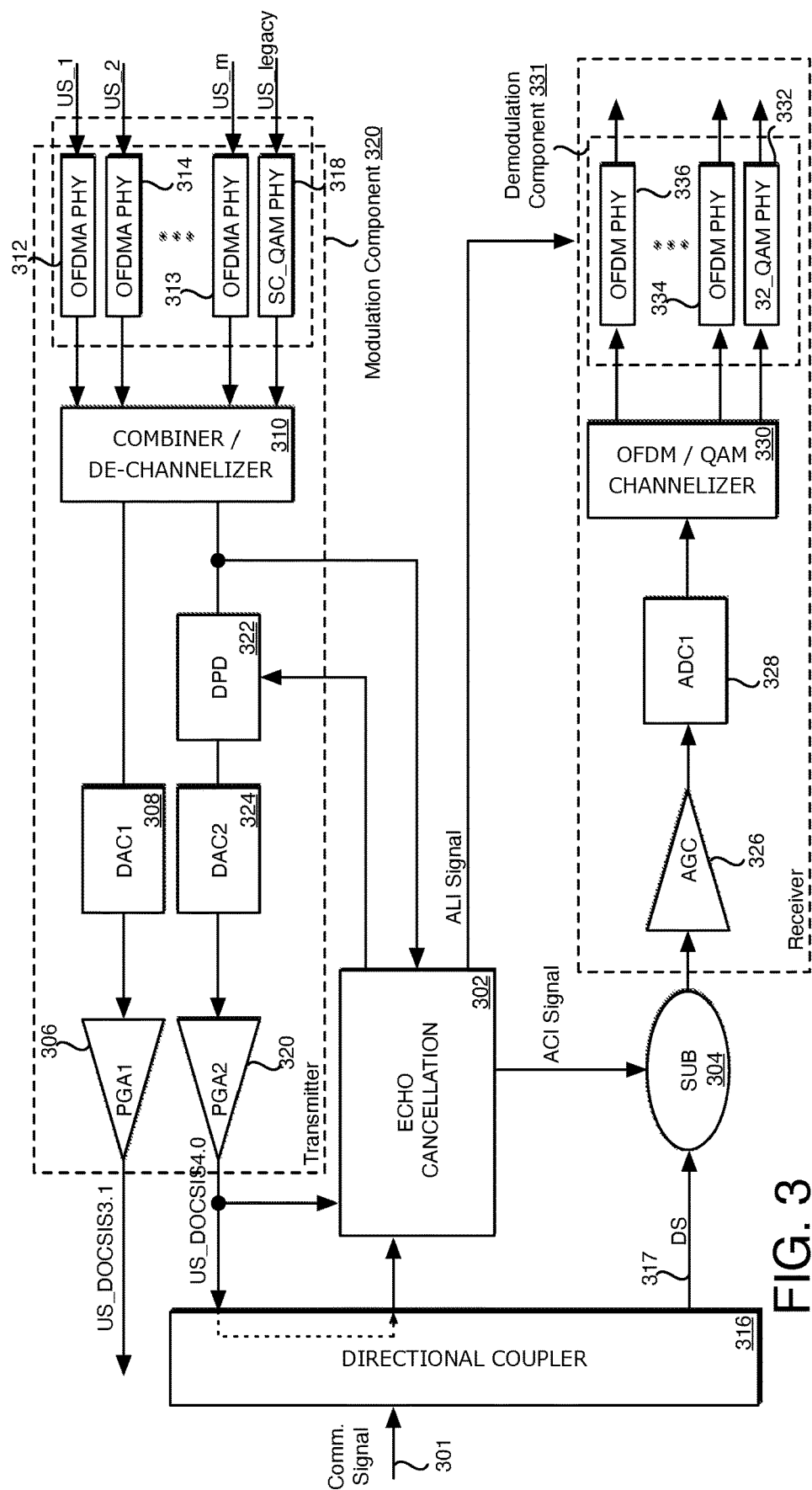
FIG. 3 illustrates a block diagram of a system to cancel interference in accordance with various embodiments.

FIG. 3 illustrates a block diagram of a system to cancel interference in accordance with various embodiments. In this example, an access device such as a cable modem or a wireless transceiver/radio includes echo cancellation component 302 among other components to cancel interference as part of a full band front-end architecture of the access device. It should be noted that echo cancellation component 302 can include one or more components configured to cancel interference at the access device. In various embodiments, echo cancellation component 302, or the components of echo cancellation component 302, can be electrically coupled to additional components of the access device or in electrical communication of the access device. In certain embodiments, echo cancellation component 302, and other components, can be implemented, for example, with digital logic gates on a single or multiple semiconductor chips configured to perform the functions described herein. In another example, computing component can be implemented with one or more semiconductor devices using a CMOS process. For example, the majority of the front-end computing component can be implemented as part of or the entirety of an application specific integrated circuit (ASIC) by digital logic gates. It is also envisioned that for certain applications, some or all of the functions of the front-end computing components can be implemented with software instructions stored on a processor readable medium, and executed by a processor, or another processor in another device. Advantageously, the front-end computing components can provide on-chip full band total spectrum reception with, e.g., DOCSIS PHY/MAC modem capability practically and economically.

Communications signal 301 can be received and transmitted at directional coupler 316. Coupler 316 can be configured to pass an upstream signal and a downstream signal on an upstream channel and a downstream channel that are adjacent to each other. Communications signal 301 can include, for example, a wideband communications signal for an example frequency range of 0-1800 MHz, in accordance with various embodiments. A wideband communications signal can be transmitted across a transmission line to be received at, for example, a wideband receiving device, such as an access device (e.g., a cable modem) or another appropriate device such as a wireless transceiver/radio in a wireless medium. The access device can be located at, for example, a subscriber's home or business, or at a Remote-PHY. The communications signal can be provided by one or more of commercial TV services, Internet data services, and voice services, e.g., Voice-over-Internet Protocol (VoIP), and the like. The communications signal can be encoded, modulated and up-converted onto radio frequency (RF) carriers, combined onto a single electrical signal, and transmitted across a communications network of a broadband provider via one or more transmission lines. In various embodiments, the communications signal can be transmitted using, for example, Orthogonal Frequency Division Multiplexing (OFDM).

Automatic Gain Control (AGC) component 326 is configured to amplify the received DS signal using variable gains to adjust the signal's power level according to the receiver's appropriate required signal power level. Analog-to-digital converter (ADC) 328 can receive and digitize a band as wide as, e.g., 1.2 GHz. In accordance with various embodiments, ADC1 328 can be a set of time-interleaved ADCs that together can digitize an entire band of several giga hertz. It should be noted that components 326 and 328 can be referred to as a receiver or receiver component. In various embodiments, at least some of components 326, 328, 330 can part of a receiver or receiver component of an access device to receive and process a downstream signal.

OFDM/QAM channelizer 330 is configured to process received signals to enable access to, for example, video, data, voice, high-speed Internet services. In an embodiment, channelizer 330 may include one or more digital signal processors, clocks, memories, and other such circuits, which are not shown for simplicity. OFDM channelizer 330 can, for example, use discrete Fourier transformation (DFT) or fast Fourier transformation (FFT) techniques to compute the spectrum of the output signals from the ADCs. FFT averaging techniques, which average the FFT's of several captures to reduce variation in the spectrum, may also be performed. In certain embodiments, OFDM channelizer 330 is configured to select one or more frequency bands or channels and provide or otherwise enable access to the bands to one or more computing components and/or devices. In an embodiment, channelizer 330 can digitally filter each 6 MHz QAM legacy channel as well as each OFDM channel of 192 MHz. For example, in FDX DOCSIS 4.0 standard, multiple OFDM channels need to be received and demodulated depending on the number of channels assigned to the cable modem or the wireless transceiver/radio. At any point in time, this number can vary. For example, the number can vary between 1 to 5 channels; however, the number of channels can be more.

Demodulation component 331 includes OFDM PHY 334 and 336 and 32 QAM PHY 332, and is configured to demodulate, decode, and de-map the samples received in each OFDM channel. For example, OFDM PHY 334 and 336 is configured to perform Fast Fourier Transform (FFT) as well as de-mapping for each OFDM received channel. A decoder handles the error correction and each PHY delivers the received digits (MAC Packets) to the upper level MAC portion.

The US signal can be transmitted via one or more paths. In an embodiment, the transmitter path that includes PGA1 306 and DAC1 308 is for transmitting the US signal in accordance with DOCSIS 3.1/3.0 legacy standard. In this path, PGA1 (programmable-gain amplifier) 306 is configured to amplify the US signal in accordance with DOCSIS 3.0/3.1 standard for the frequency range of 5-204 MHz. DAC1 (digital to analog converter) 308 can convert the US signal into the analog domain after modulation component 320 performs OFDMA and QAM modulation techniques on the US signal and combiner/de-channelizer component 310 can digitally up-covert the US signal according to a channel assignment received from a CMTS.

Modulation component 320 (e.g., an OFDMA modulator) can include OFDMA PHYs (312, 314, 313) and SC_QAM PHY 318. OFDMA PHY 312, 314, 313 and SC_QAM PHY 318 are operable to perform one or more of IF modulation to add guard intervals, QAM mapping, pre-equalizer, IFFT, I/Q parallel to serial, CP insertion, shaping filter, and symbol to sample rate converter. It should be noted that modulation component 320 can be referred to as a digital transmitter component. In various embodiments, at least some of components 306, 320, 308, 324, 322, 310, 320 can be associated with a transmitter of an access device to transmit an upstream signal.

In an embodiment, the US signal can include "m" US signals.

Combiner/De-channelizer component 310, in accordance with a frequency assignment associated with a CMTS, up-coverts the US signal.

The transmitter signal path that includes PGA2 320 and DAC2 324 is for transmitting the US signal in accordance with DOCSIS 4.0. It should be noted that the US signal can be sent in accordance with other communication standards. In this path, PGA2 320 is configured to be operational in the FDX band of 5-684 MHz.

DAC2 324 is configured to convert the US signal from the digital domain to the analog domain using sampling rates higher (e.g., three times higher) than the frequency range of PGA2 320. It should be noted that sampling rate can be a multiple of the US transmission band. Sampling at an increased rate in certain embodiments enables the successful operation of digital-pre-distortion (DPD) component 322. For example, the FDX band is three times wider than previous DOCSIS 3.1 US transmission band, thus non-linearity is introduced in the US signal due to the wide band operation of PGA2 320. The non-linearities can affect the transmitted US signal-to-noise ratio as well as the out of band leakage and noise out of PGA 320.

DPD 322 is configured to reduce/filter the non-linearity associated with the wide band PGA2 320 operating in the FDX band. DPD 322 in certain embodiments can be calibrated to determine samples of a digital transmitted US signal using a feedback path that receives samples from the output of PGA2 320 and a signal from Echo cancellation component 302.

Echo cancellation component 302 is configured to cancel interference associated with receiving downstream signals at the access device and transmitting upstream signals from the access device. For example, echo cancellation component 302 uses trained filters (e.g., ACI and ALI filters, not shown) and samples of the digital transmitted US signal from the output of combiner/de-channelizer component 310 to estimate a digital ACI signal and the sampled echoed transmitted signal to estimate a digital ALI signal. The digital ACI signal can be converted into an analog ACI signal and the analog ACI signal can be subtracted from the received analog DS signal to eliminate or at least reduce the adjacent and echoed US signal. The adjacent and echoed US signal can be due to the fact that directional coupler 316 does not filter in certain embodiments the adjacent signals and echoed US signals to DS signal 317. Because the adjacent and echoed US signals are typically seen as reflections, these signals are sometimes referred to as echo interference. To properly operate receiver functions at the access device, these signals should be cancelled from DS signal 317 prior to AGC 326. If the adjacent and echoed US signals are not removed, the receiver's dynamic range can be affected, which can result in reduced receiver performance. The digital ALI signal can be used at the receiver's demodulator (e.g., demodulation component 331) to subtract leakage as co-channel noise from received digital DS signals.

Figure 4:
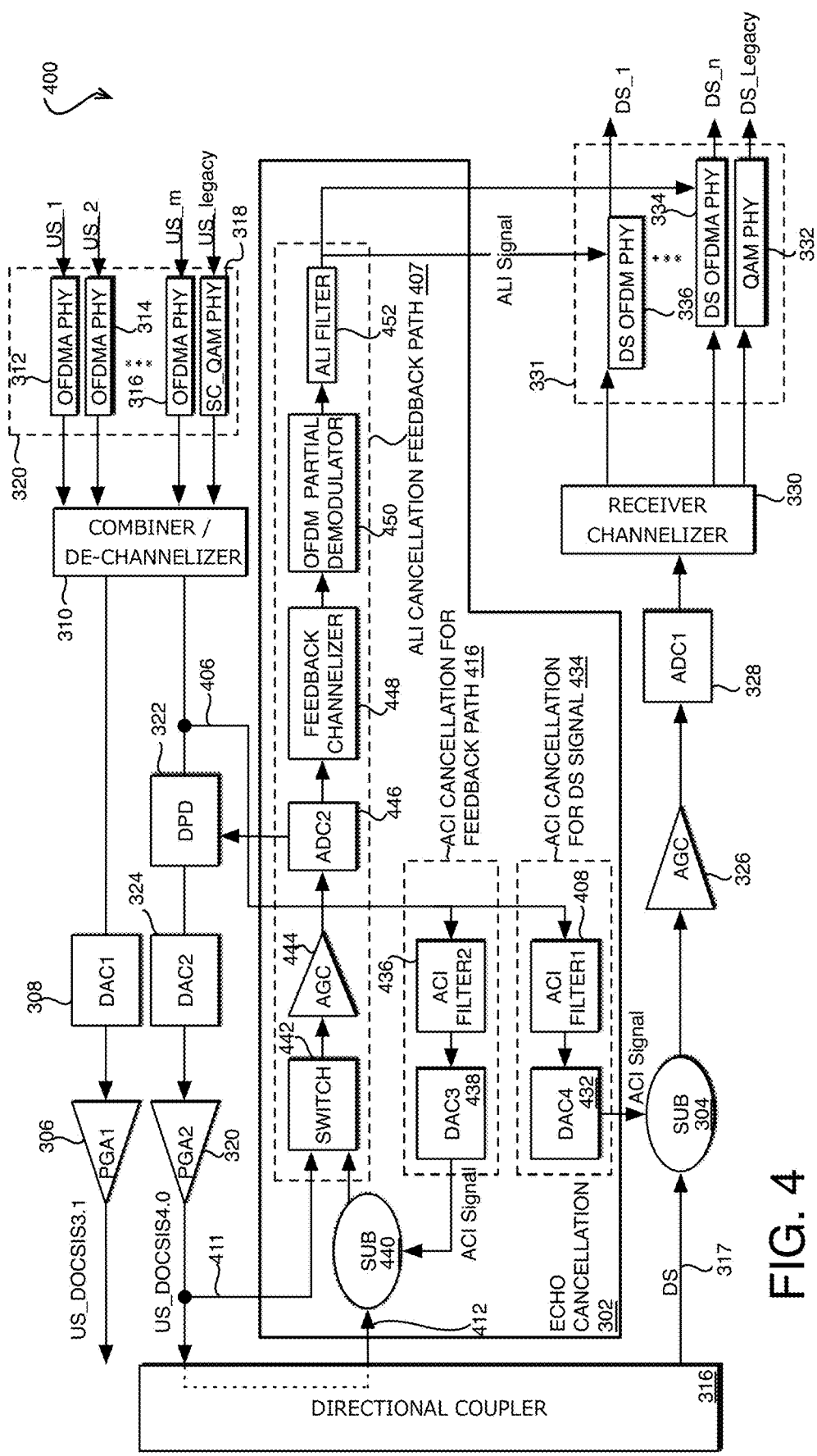
FIG. 4 illustrates a block diagram of a system to cancel interference similar to FIG. 3 but illustrates additional components in accordance with an embodiment.

FIG. 4 illustrates a block diagram 400 of a system to cancel interference similar to FIG. 3 but illustrates additional components in accordance with various embodiments. In this example, echo cancellation component 302 is shown to include ALI cancellation feedback path 407, ACI cancellation for feedback path 416, and ACI cancellation for DS signal path 434.

ACI cancellation for the DS signal path 416 includes, for example, ACI filter1 408 and DAC4 432.

ACI cancellation for the ALI cancellation feedback path 416 includes, for example, ACI filter2 436 and DAC3 438.

ALI cancellation path 407 includes, for example, switch 442, AGC 444, ADC2 446 feedback channelizer 448, OFDM partial demodulator 450, and ALI filter 452. It should be noted that additional or fewer components may be included in paths 407, 416, and 434 in accordance with the various embodiments described herein. It should be further noted that components 444 and 446 can be referred to as a receiver or receiver component. In various embodiments, at least some of components 442, 444, 446, 448, 450 can part of a receiver or receiver component of an access device.

To remove ACI from the downstream signal, the upstream digital signals generated at modulation component 320 (also referred to as upstream PHY) and combined at combiner/de-channelizer 310 can also be provided to ACI cancelation path for the DS signal 317. For example, samples of the upstream signal of the output of combiner/de-channelizer 310 can be provided to a pre-trained filter, for example, ACI filter1 408 of ACI cancellation for DS signal path 434. ACI cancellation for DS signal path 434 can include ACI filter1 408 and DAC4 432. ACI filter1 408 is operable to estimate/replicate ACI experienced by the US signal at the receiver (e.g., components 326, 328) prior to AGC 326. The estimated digital ACI can be converted to an analog signal by DAC4 432 and subtracted from the received DS signal 317 at subtractor component 304.

Adjacent Leakage Interference (ALI) cancellation feedback path 407 can be configured to cancel the effects of ALI at demodulation component 331. For example, samples 412 (e.g., an echoed transmit signal) can be converted into digital samples via ADC2 446 prior to channelization (according to the allocated DS channel) by feedback channelizer 448. Leakage created and echoed by PGA2 320 can be sampled and modified to replicate estimated distortions caused from samples 412 of the output of PGA2 320 and reflected and received at directional coupler's 316 interface. ALI filter 452 is trained to generate an ALI signal which can be used to cancel the effects of ALI at the receiver's demodulation component 331. It should be noted that demodulation component 331 can be associated with components 326, 328, 330 that can be part of a receive path of the access device. In some embodiments, at least some of these components can be included with or at least associated with a receiver component for the receive path.

In an embodiment, for ADC2 446 to accurately sample output 412, ACI caused by the US signal is cancelled using the components of ACI cancellation for feedback path 416. For example, ACI filter2 436 obtains samples 406 of the US digital signal, and replicates distortions that occur when the US digital signal is passed through DPD 322, DAC2 324, PGA2 320, directional coupler 316 and reflected via multiple reflection points. Accordingly, ACI filter2 436 is trained to cancel the effects of ACI caused by the US signal. DAC3 438 converts the US digital signal into an analog signal, and the US analog signal is subtracted from ALI cancellation feedback path 407 at subtractor 440. In accordance with various embodiments, ADC2 414 can be occasionally utilized to train and calibrate DPD filter 322 to replicate the non-linearities introduced by PGA2 320 by sampling the output of PGA2 320 using sampling point 411 and to pre-distort the US signal accordingly.

Figure 5:
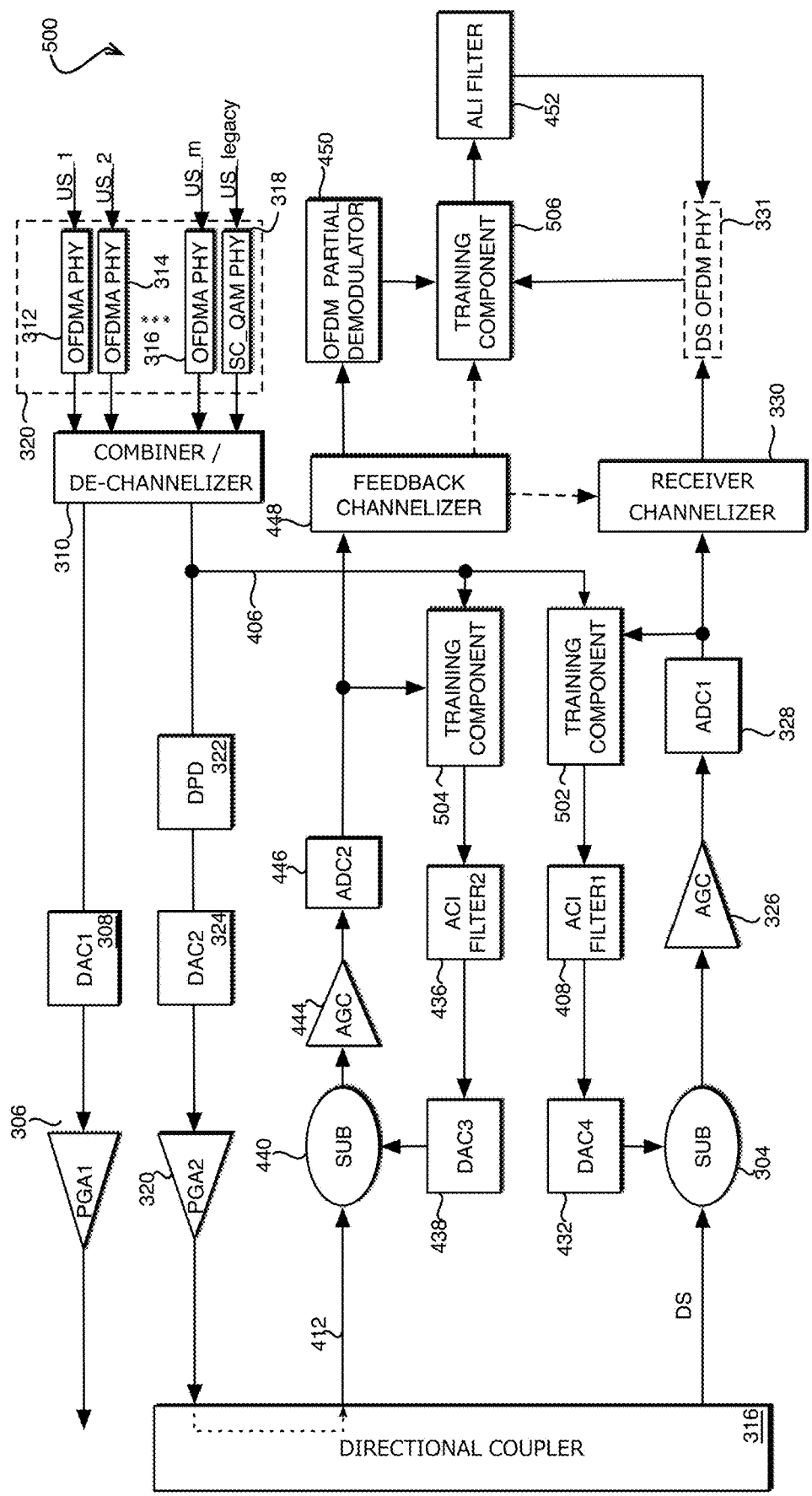
FIG. 5 illustrates an example of a block diagram of a system to train filters to cancel interference in accordance with various embodiments.

FIG. 5 illustrates example 500 of a block diagram of a system to train filters (e.g., ACI filters 436 and 408 and ALI filter 452) to cancel interference in accordance with various embodiments. In this example, during a training phase, ACI filter1 408 is trained using training component 502, ACI filter2 436 is trained using training component 504, and ALI filter 452 is trained using training component 506.

In an embodiment, there are at least two training phases in the DOCSIS 4.0 standard. In a first phase, or a foreground training phase, the FDX CM transmits at regular power levels in the sub-bands that are in the upstream direction in the allocated US sub-band direction set. The training signal is transmitted on the US sub-band and a training algorithm controls the order in which each sub-band is trained on ACI filter1 408 and ACI filter2 436.

In an embodiment, the foreground training phase can be requested by the CM and granted by the CMTS. It should be noted that other appropriate components may be used to request and/or grant the foreground training phase. During foreground training, the cable modem (e.g., access point) is transmitting and the CM can transmit and receive on each US sub-band, thus training ACI filter1 408 and ACI filter2 436.

In a second phase, (also referred to as a background training phase), no US bandwidth is consumed. Instead, the FDX CM sends a low-level signal on the sub-band(s) that are assigned in the resource block assignment (RBA) as DS direction. What is transmitted by the FDX CM during background training is chosen by CM. In an embodiment, the background training phase does not use probe allocations but does use assignment of a training window because the CMTS is responsible for limiting the number of CMs performing background training at the same time in order to manage the total emissions on a plant. During the background training phase, the CM transmits the low level signal on the assigned DS channels and receives the echoed feedback signal on the feedback path and training component 506 uses training algorithms to estimate coefficients for ALI filter 452 from the point the feedback signal is received, channelized and partially passed through demodulator 450 (this is partial since it does not include error correction decoders) to the point that the received signal is received, channelized at receiver channelizer 330 and partially demodulated. The filter coefficients for ALI filter 452 are estimated in such a way that when applied to the echoed leaked feedback signal during operation, the result is the replicated echoed leaked signal at the received path. This replicated leakage signal can then be subtracted from the received bits as ALI co-channel interference.

Figure 6A:
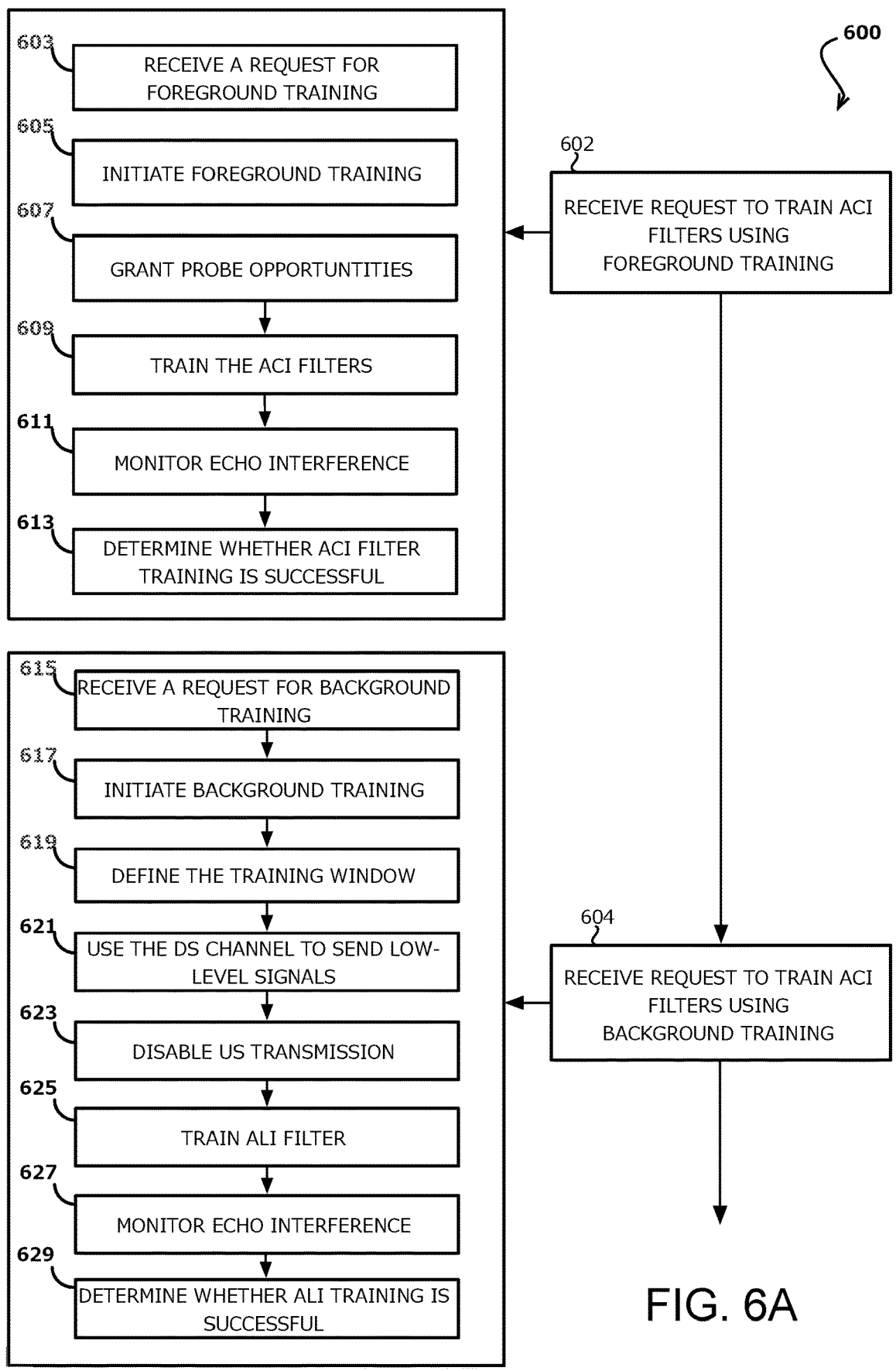
FIGS. 6A and 6B illustrate an example process for training filters to cancel interference in accordance with various embodiments.
Figure 6B:
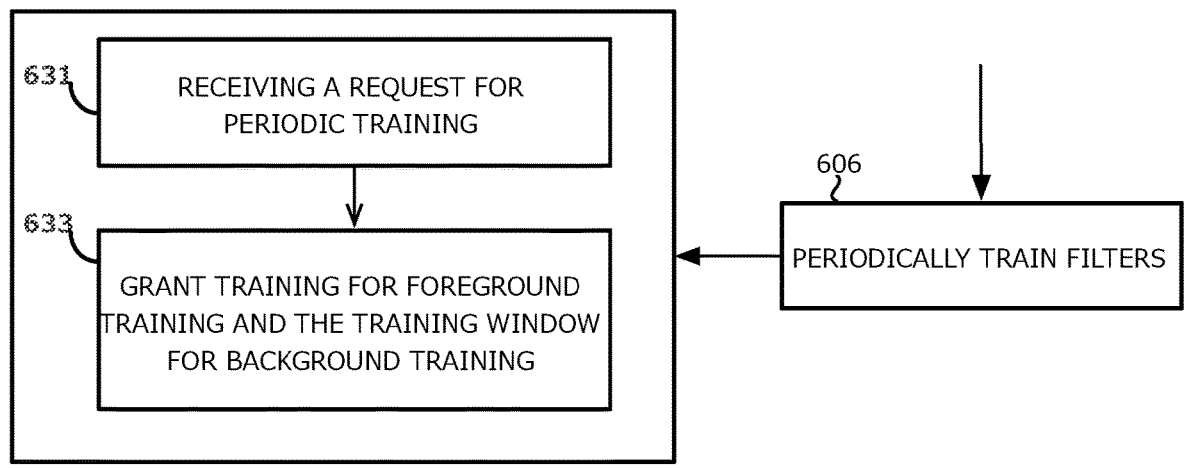

FIGS. 6A and 6B illustrate example process 600 for training ACI filter 436 and 408 and ALI filter 452 to cancel interference in accordance with various embodiments. It should be understood that for any process described herein, that there can be additional or fewer steps performed in similar or alternative orders, or in parallel, within the scope of the various embodiments unless otherwise stated. In this example, a request to train ACI filters is received 602. Training the ACI filters can include, for example, receiving 603 a request (e.g., ECT_REQ) at a cable modem termination system (CMTS) or other appropriate component from a cable modem (CM) or another appropriate component. The request can be associated with, for example, an ID such as a tunnel group ID (TGID) or other such information. The request can be to initiate 605 foreground training. A response to the request can be sent from the CMTS and received at the CM. The response can grant 607 ECT probe opportunities to the CM. In certain embodiments, ZBL is requested. In an embodiment, during the foreground phase, CM can use the US channel (no DS from CMTS) to train 609 the ACI filters. The CM monitors 611 echo interference to determine 613 whether initial ACI training is successful.

A request to train the ALI filter is received 604. Training the ALI filter can include, for example, receiving 615 a request (e.g., ECT_REQ) at the CMTS from the CM. The request can be to initiate 617 background training. A response to the request (e.g., ECT_RSP) can be sent from the CMTS and received at the CM. The response can define 619 the training window (e.g., start time) for the CM. In an embodiment, during the background phase, the CM can use 621 the DS channel to send low-level signals. The US transmission is disabled 623. The CM can use the window to train 625 ALI filter on the DS channel. The CM monitors 627 echo interference to determine 629 whether initial ALI training is successful.

Thereafter, periodic training of the ACI filters and the ALI filter is initiated 606. Periodic training can include, for example, receiving 631 a request (e.g., ECT_REQ) at the CMTS from the CM for periodic training. Both foreground and background training can be requested. A response to the request can be sent from the CMTS and received at the CM. The response can grant 633 training for foreground training and the training window time for background training. CM may request in certain embodiments for training at any time and may change the periodic training specifications accordingly.

Figure 7:
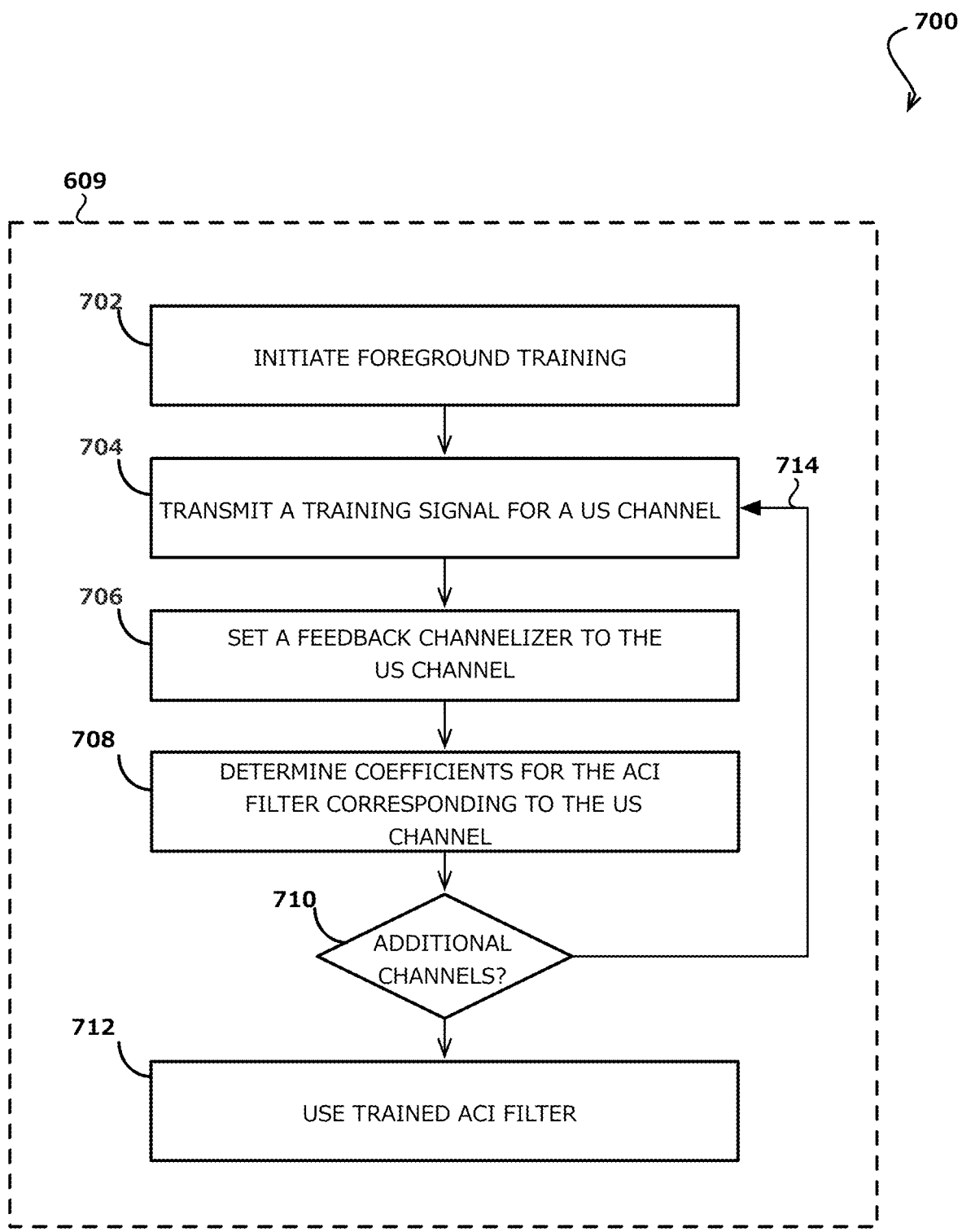
FIG. 7 illustrates an example process for training ACI filters using foreground training in accordance with various embodiments.

FIG. 7 illustrates example process 700 for training ACI filters using foreground training in accordance with various embodiments. In this example, additional steps of function block 609 of FIG. 6A are explained. In an embodiment, foreground training is initiated 702. For a first US channel of a set of US channels, a training signal is transmitted 704. A feedback channelizer is set 706 to the first channel. An ACI filter corresponding to the first channel is trained to determine 708 coefficients for the ACI filter until convergence. If it is determined 710 that all US channels are trained, using any appropriate criterion, then foreground training can complete, and the trained ACI filters be utilized 712 or stored for other purposes. Otherwise the process can continue 714 until an ACI filter is trained for each channel, or at least a threshold number of US channels, or another stop condition is satisfied.

Figure 8:
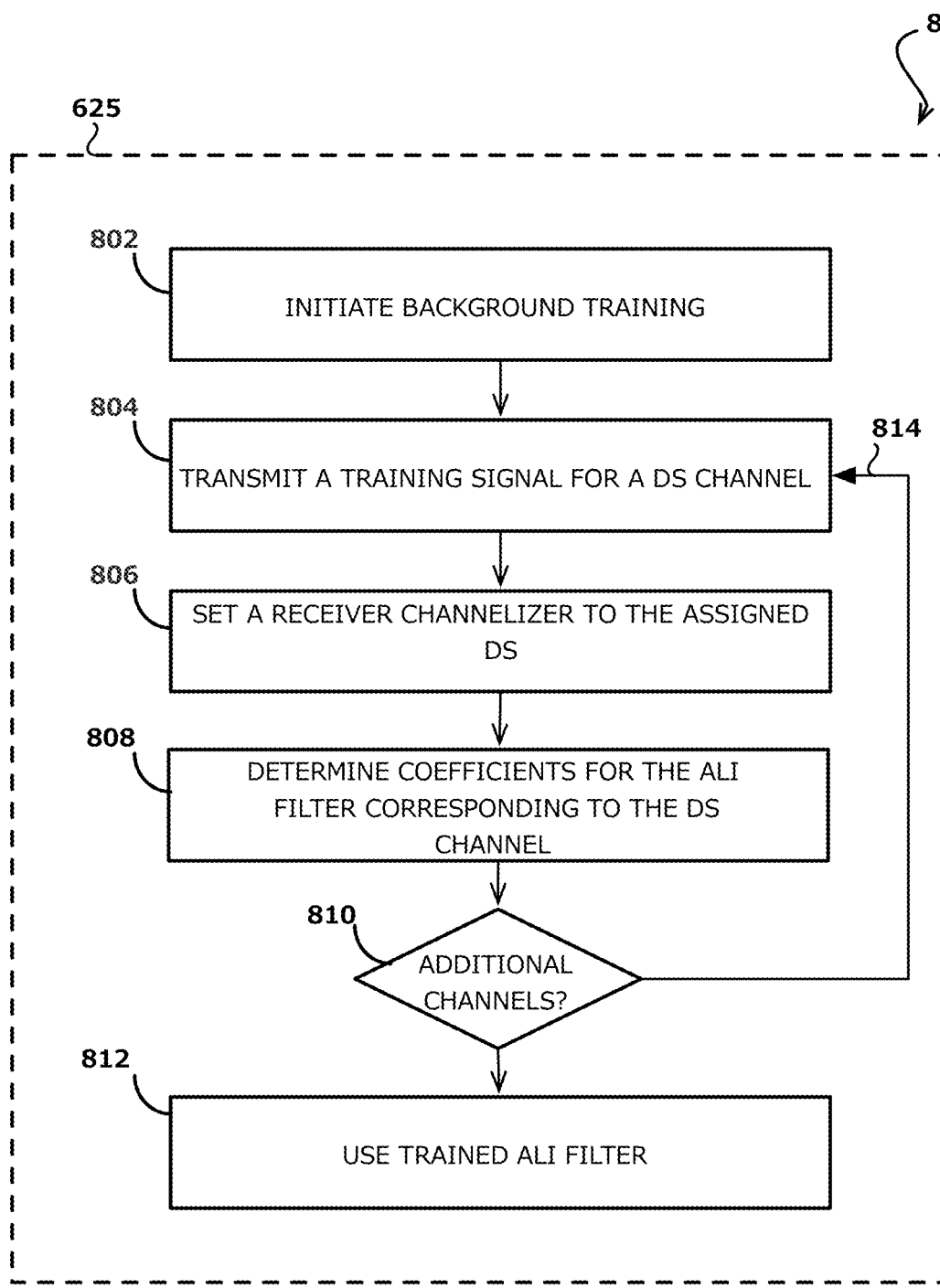
FIG. 8 illustrates an example process for training ALI filters using background training in accordance with various embodiments.

FIG. 8 illustrates example process 800 for training ALI filters using background training in accordance with various embodiments. In this example, additional steps of function block 625 are explained. In an embodiment, background training is initiated 802. For a first assigned DS channel of a set of DS channels, a training signal is transmitted 804. A receiver channelizer is set 806 to the first assigned DS channel. An ALI filter corresponding to the first assigned DS channel is trained to determine 808 coefficients for the ALI filter until convergence. If it is determined 810 that all DS channels are trained, using any appropriate criterion, then background training can complete, and the trained ALI filters be utilized 812 or stored for other purposes. Otherwise the process can continue 814 until an ALI filter is trained for each DS channel, or at least a threshold number of DS channels, or another stop condition is satisfied.

Figure 9:
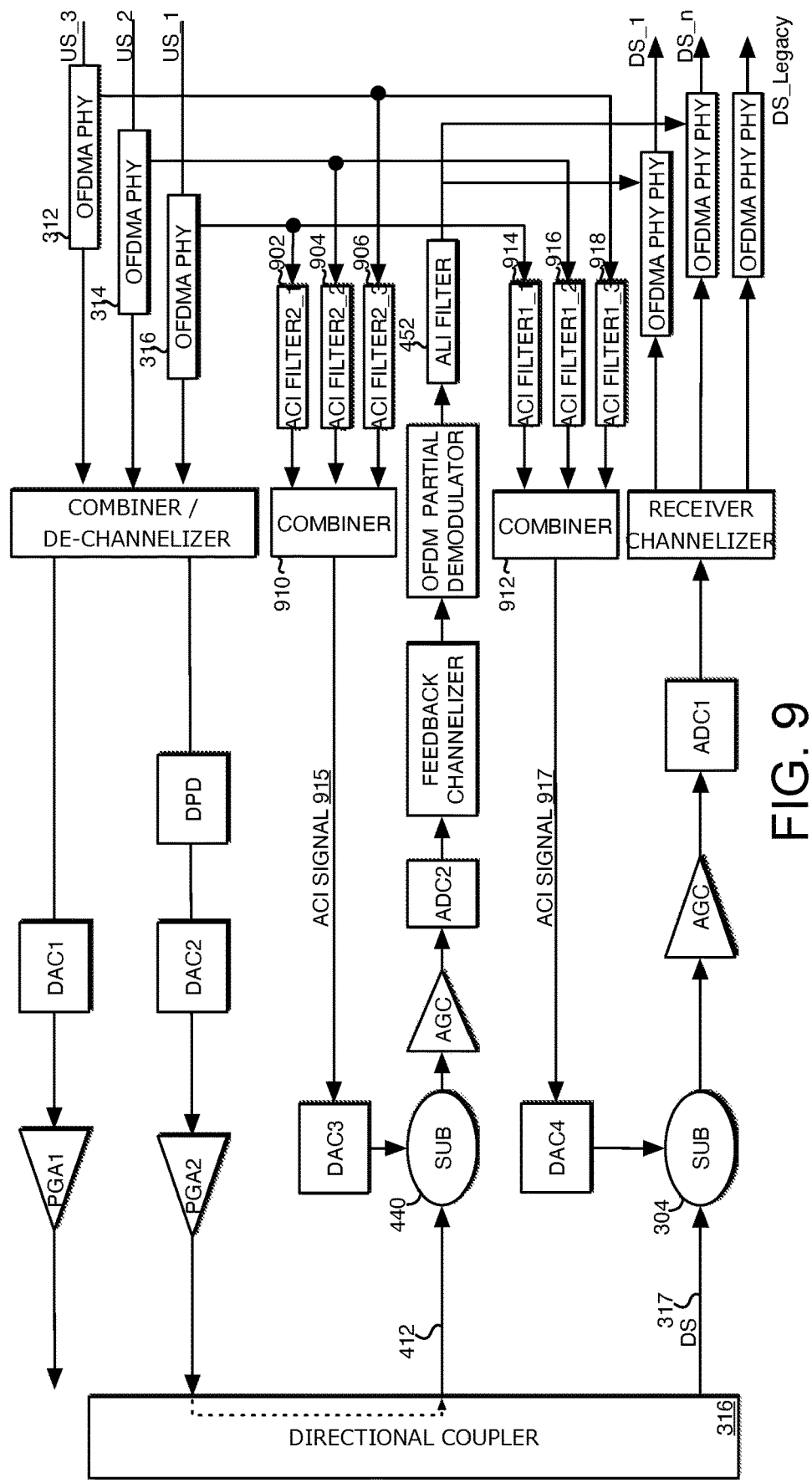
FIG. 9 illustrates a block diagram of a system to cancel interference in accordance with an alternate embodiment.

FIG. 9 illustrates a block diagram of a system to cancel ACI and ALI in accordance with an alternate embodiment. In this example, US OFDMA channels 312, 314, and 313 can be sampled prior to IFFT (partially modulated samples that are considered to be in frequency domain). ACI filters 902, 904, and 906 can be trained in accordance with embodiments described herein for particular channels. For example, ACI filter 902 can be trained for OFDMA channel 312, ACI filter 904 can be trained for OFDMA channel 314, and ACI filter 906 can be trained for OFDMA channel 312. OFDMA PHY 312, 314, and 313 modulate data during operation for respective US channels. The associated ACI filter for each OFDMA channel cancels the ACI for the feedback path and the receiver path. In accordance with an embodiment, at any point in time, any combination of US OFDMA channels 312, 314, and 313 can be active. Combiner 910 is configured to up-convert and combine the signals from ACI filters 902, 904, and 906, and generate digital ACI signal 915. Digital ACI signal 915 is utilized in accordance with embodiments described herein.

In an embodiment, the procedure occurs for ACI filters 914, 916, and 918, which are substantially the same as ACI filters 902, 904, and 906. For example, trained ACI filters 914, 916, and 918 obtain modulated data from corresponding one of OFDMA PHY 312, 314, and 313, and cancel the ACI for the feedback path and the receiver path. Combiner 912 up-converts and combines the signals from ACI filters 914, 916, and 918, and generate digital ACI signal 917. Digital ACI signal 917 is utilized in accordance with embodiments described herein.

Figure 10:
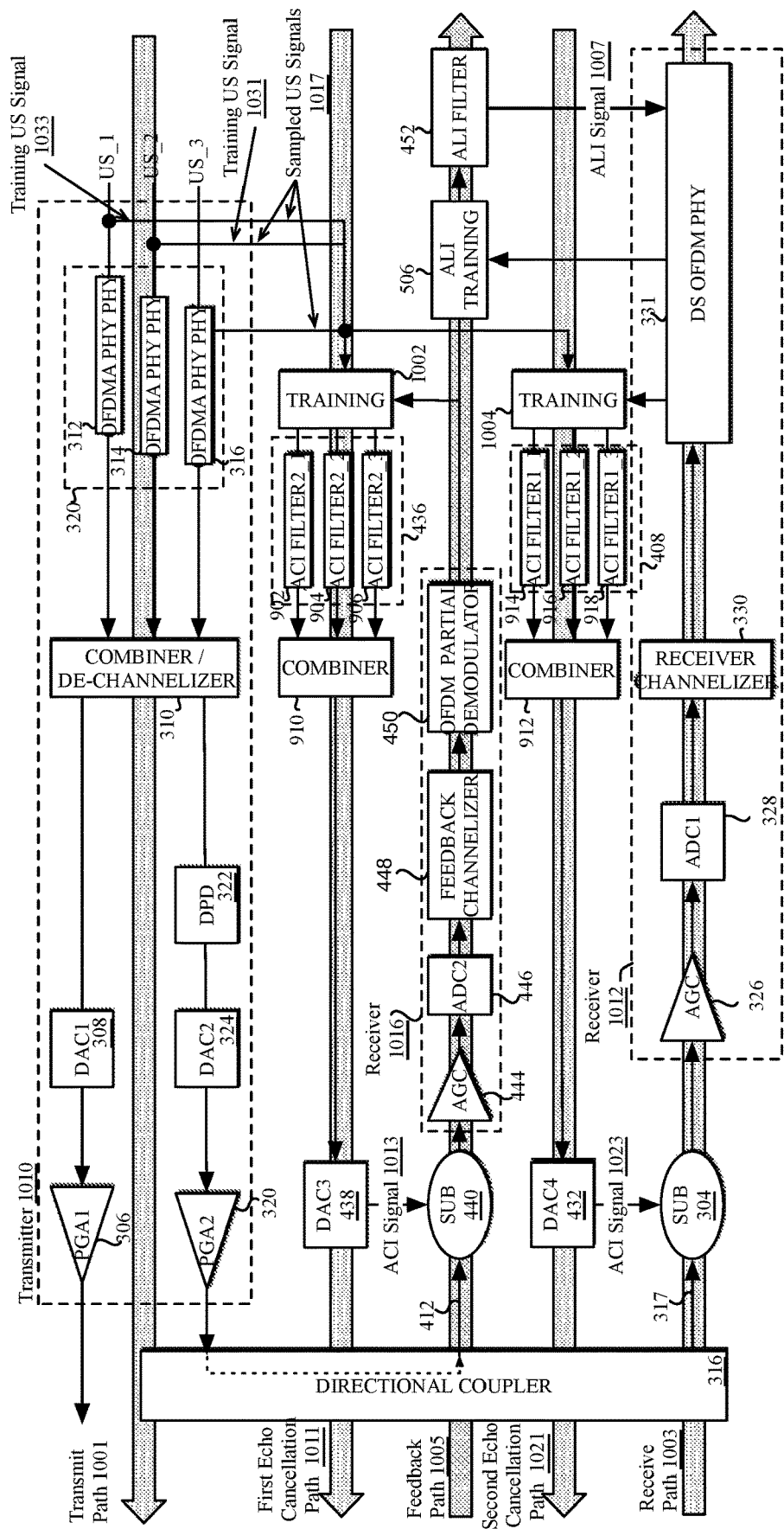
FIG. 10 illustrates a block diagram of a system to train filters to cancel in accordance with an alternate embodiment.

FIG. 10 illustrates a block diagram of a system to train filters in accordance with an alternate embodiment. In this example, ACI filters 902, 904, and 906 can be trained via foreground training using training component 1002 to cancel ACI in a feedback path. ACI filters 914, 916, and 918 can be trained via foreground training using training component 1004 to cancel ACI in a receiver path. For example, directional coupler 316 can be configured to pass an upstream signal and a downstream signal on an upstream channel and a downstream channel that are adjacent.

A transmit path 1001 can include digital transmitter 1010 configured to transmit an upstream signal. Digital transmitter 1010 can include a number of component, including, for example, at least one or more of, or some combination of, PGA1 306, DAC1 308, combiner/de-channelizer 310, modulation component 320, PGA2 320, DAC2 324, and DPD 322.

A receive path 1003 can include receiver component 1012 and subtraction component 304. Receiver component 1012 can include, for example, one or more of, or some combination of, AGC 326, ADC1 328, receiver channelizer 330, and DS OFDM 331.

A feedback path 1005 can be configured to process sampled echoed transmit signal 412 using, for example, set of filters 452 of a first filter type (e.g., ALI) to generate an interference signal 1007 (e.g., ALI signal) that is received at DS OFDM 331 or another appropriate component of receiver component 1012. The feedback path can be associated with receiver component 1016. Receiver component can be associated with one or more of, or some combination of, AGC 444, ADC 446, feedback channelizer 446, and OFDM partial demodulator 450. In an embodiment, interference signal 1007 can be used to reduce effects of ALI at receive path 1003. Feedback path 1005 can be associated with subtraction component 440, AGC 444, ADC2 446, feedback channelizer 448, OFDM partial demodulator 450, and ALI training component 506 configured to train set of filters 452.

A first echo cancellation path 1011 for feedback path 1005 can be configured to generate interference signal 1013 (ACI) received at subtraction component 440 to reduce effects of interference caused by echoed upstream signal 412 adjacent to the downstream channel of the receive path by processing a sampled upstream signal 1017 using set of filters 436 of a second filter type (e.g., ACI). First echo cancellation path 1011 can be associated with training component 1002 configured to train set of filters 436, combiner 910, and DAC3 438.

A second echo cancellation path 1021 for the receive path 1003 can be configured to generate interference signal 1023 (e.g., ACI signal) received at subtraction component 304 to reduce effects of interference caused by echoed upstream signal 412 by processing sampled upstream signal 1017 using set of filters 408 of the second type (e.g., ACI). In an embodiment, second echo cancellation path 1021 can be associated with training component 1004 configured to train set of filters 408, combiner 912, and DAC4 432.

During a training phase, a first training upstream signal 1031 for an upstream channel from one of the digital transmitter components (e.g., 312, 314, 316) at training component 1002 and training component 1004 is received. Echoed signal 412 of first training upstream signal 1031 from directional coupler 316 is received at training component 1002 via feedback path 1005 while feedback path 1005 is receiving on a same downstream channel as the upstream channel for first training upstream signal 1031. A reflected feedback representation of first training upstream signal 1031 is generated. A first mismatch between first training upstream signal 1031 and reflected feedback representation 412 of first training upstream signal 1031 is determined. Filter coefficients at training component 1002 for set of filters 436 are recursively estimated until the first mismatch satisfies a threshold amount of mismatch. Downstream signal 317 is received via receive path 1003 at training component 1004 while receive path 317 is receiving on the same downstream channel as the upstream channel for first training upstream signal 1031. A reflected representation 412 of first training upstream signal 1031 is generated. A second mismatch between first training upstream signal 1031 and the reflected representation of first training upstream signal 1031 is determined. Filter coefficients for set of filters 408 is recursively estimated until the second mismatch satisfies the threshold amount of mismatch. An echoed signal (not shown) from the directional coupler from training upstream signal 1033 transmitted on a channel associated with receive path's downstream operation on upstream path 1001 at training component 506 via feedback path 1005 is received. Downstream signal 317 is received via receive path 1003 at training component 506. A mismatch between the echoed signal of training upstream signal 1033 and downstream signal 317 is determined. Filter coefficients for set of filters 452 is recursively estimated until the mismatch satisfies the threshold amount of mismatch. Thereafter, set of filters 436, 408, and 452 are enabled for use.

In the embodiments described herein, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Figure 11:
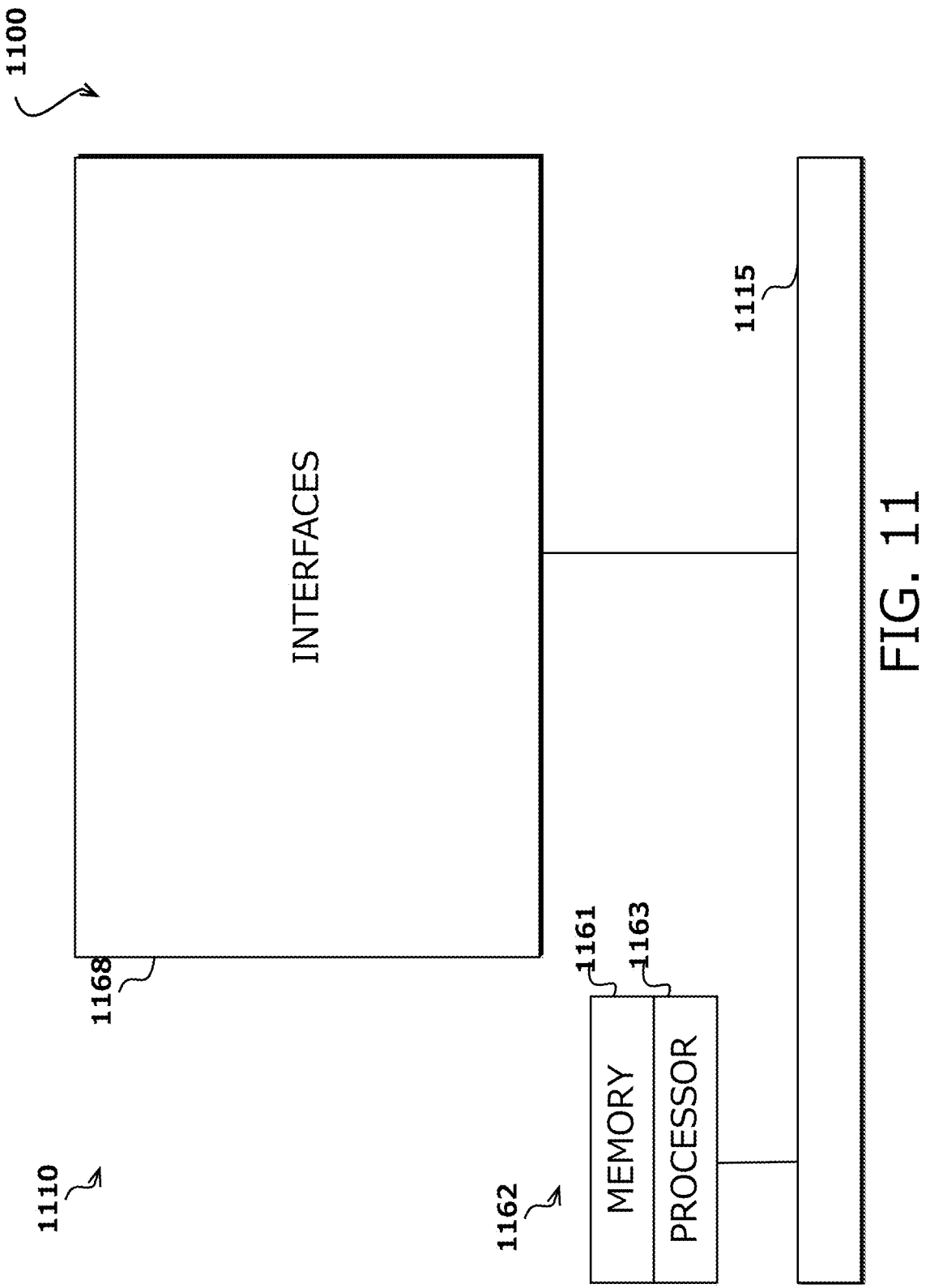
FIG. 11 illustrates an exemplary access device, such as a cable modem, that can be utilized in accordance with various embodiments.

FIG. 11 illustrates example 1100 of an exemplary network device 1110, such as a cable modem, that can be utilized in accordance with various embodiments. Network device 1110 includes a master central processing unit (CPU) 1162, interfaces 1168, and a bus 1115 (e.g., a PCI bus). When acting under the control of appropriate software or firmware, the CPU 1162 is responsible for numerous tasks, at least some of which relate to network management. It preferably accomplishes all these functions under the control of software including an operating system and any appropriate applications software. CPU 1162 may include one or more processors 1163. In an alternative embodiment, processor 1163 is specially designed hardware for controlling the operations of network device 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communication's intensive tasks, these interfaces allow the master microprocessor 1162 to efficiently perform routing computations, network diagnostics, security functions, etc.

Although the system shown in FIG. 11 is one specific network device of the present invention, it is by no means the only network device architecture on which the present invention can be implemented. For example, an architecture having a single processor that handles communications as well as routing computations etc. is often used. Further, other types of interfaces and media could also be used with the router.

Regardless of the network device's configuration, it may employ one or more memories, or memory modules (including memory 1161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 12:
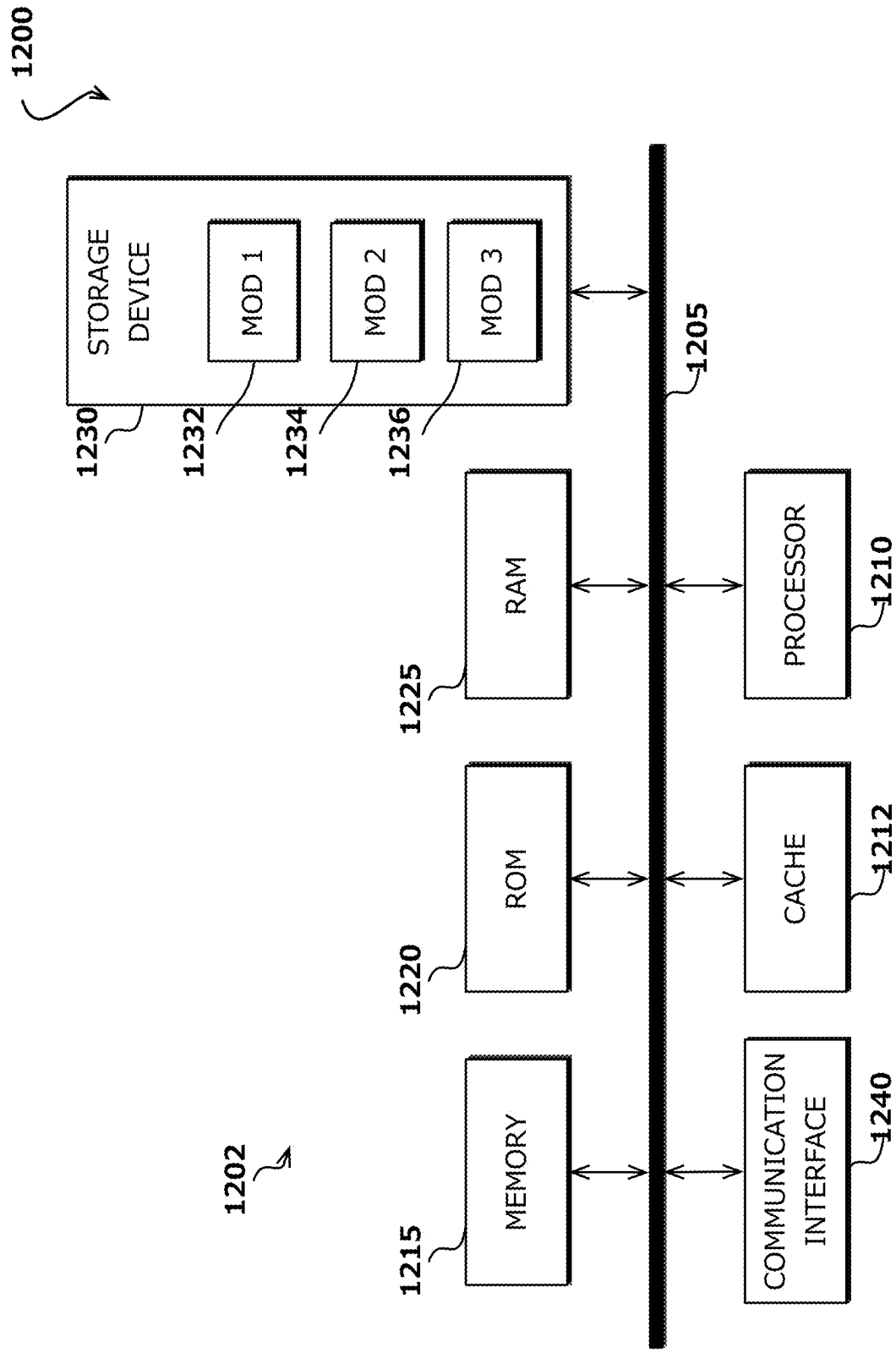
FIG. 12 illustrates example components of an access device, such as the access device illustrated in FIG. 11.

FIG. 12 illustrates example 1200 of exemplary possible system embodiments, such a system making up network device 1110 of FIG. 11. The more appropriate embodiment will be apparent to those of ordinary skill in the art when practicing the present technology. Persons of ordinary skill in the art will also readily appreciate that other system embodiments are possible. FIG. 12 illustrates a conventional system bus computing system architecture 1202 wherein the components of the system are in electrical communication with each other using a bus 1205.

Exemplary system 1200 includes a processing unit (CPU or processor) 1210 and a system bus 1205 that couples various system components including the system memory 1215, such as read-only memory (ROM) 1220 and random-access memory (RAM) 1225, to the processor 1210. The system 1200 can include a cache of high-speed memory connected directly with, in close proximity to, or integrated as part of the processor 1210. The system 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other system memory 1215 may be available for use as well. The memory 1215 can include multiple different types of memory with different performance characteristics. The processor 1210 can include any general-purpose processor and a hardware module or software module, such as module 1 1232, module 2 1234, and module 3 1236 stored in storage device 1230, configured to control the processor 1210 as well as a special-purpose processor where software instructions are incorporated into the actual processor design. The processor 1210 may essentially be a completely self-contained computing system, containing multiple cores or processors, a bus, memory controller, cache, etc. A multi-core processor may be symmetric or asymmetric. The processor can be implemented with one or more virtual processors, as well as any combination of CPUs and virtual processors.

The communications interface 1240 can generally govern and manage the user input and system output. There is no restriction on operating on any particular hardware arrangement, and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read-only memory (ROM) 1220, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or another intangible medium to facilitate communication of such instructions. Transmission media includes coaxial cables, copper wire, and fiber optics, including wires that comprise bus 1205 for transmitting a computer data signal.

The storage device 1230 can include software modules 1232, 1234, 1236 for controlling the processor 1210. Other hardware or software modules are contemplated. The storage device 1230 can be connected to the system bus 1205. In one aspect, a hardware module that performs a particular function can include the software component stored in a computer-readable medium in connection with the necessary hardware components, such as the processor 1210, bus 1205, and so forth, to carry out the function.

For clarity of explanation, in some instances, the present technology may be presented as including individual functional blocks including functional blocks comprising devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. In some examples, hard-wired circuitry may be used in place of or in combination with software instructions for implementation. Portions of computer resources used can be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments can be implemented in a wide variety of operating environments, which in some cases can include one or more user electronic devices, integrated circuits, chips, and computing devices—each with the proper configuration of hardware, software, and/or firmware as presently disclosed. Such a system can also include a number of the above exemplary systems working together to perform the same function disclosed herein—to filter tones from a mixed signal using novel integrated circuits in a communications network.

Most embodiments utilize at least one communications network that would be familiar to those skilled in the art for supporting communications using any of a variety of commercially available protocols, such as TCP/IP, FTP, UPnP, NFS, and CIFS. The communications network can be, for example, a cable network, a local area network, a wide-area network, a virtual private network, the Internet, an intranet, an extranet, a public switched telephone network, an infrared network, a wireless network and any combination thereof.

The environment can include a variety of data stores and other memory and storage media as discussed above—including at least a buffer. These storage components can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. An access device configured to transmit an upstream signal and receive a downstream signal on an upstream channel and a downstream channel that are adjacent; comprising:
   a directional coupler;
   a transmit path that includes a digital transmitter component configured to transmit the upstream signal;
   a receive path that includes a first receiver component and a first subtraction component;
   a feedback path for processing a sampled echoed transmit signal obtained from the transmit path, the feedback path comprising a set of adjacent leakage interference (ALI) filters, the feedback path operable to generate an ALI signal that is received at the first receiver component associated with the receive path to reduce effects of ALI at the first receiver component associated with the receive path, the feedback path comprising a second receiver component, a second subtraction component, and a training component configured to train the set of ALI filters by obtaining and processing first signals from the receive path and second signals from the feedback path while the receive path and the feedback path are operating on a channel associated with downstream reception and a first training upstream signal is transmitted on the channel associated with the downstream channel on the transmit path, and estimating filter coefficients for the set of ALI filters;
   a first echo cancellation path for the feedback path being configured to generate a first adjacent channel interference (ACI) signal received at the second subtraction component associated with the feedback path, the first ACI signal determined by processing a sampled upstream signal associated with the transmit path using a first set of ACI filters at the first echo cancellation path,
   the first set of ACI filters being trained by processing both a second training upstream signal and receiving and processing a first echoed second training upstream signal for the upstream channel from the directional coupler on the feedback path operating on a channel associated with upstream transmission; and
   a second echo cancellation path for the receive path being configured to generate a second ACI signal received at the first subtraction component associated with the receive path, the second ACI signal obtained by processing the sampled upstream signal associated with the transmit path using a second set of ACI filters at the second echo cancellation path, the second set of ACI filters being trained by processing both the second training upstream signal and receiving and processing a second echoed second training upstream signal for the upstream channel from the directional coupler on the receive path operating on the channel associated with upstream transmission,
   wherein the transmit path, receive path, first echo cancellation path, and second echo cancellation path are coupled to the directional coupler, and wherein filter coefficients for the first set of ACI filters and the second set of ACI filters is estimated before estimating the filter coefficients for the set of ALI filters.

2. The access device of claim 1, wherein during a training phase, the access device is configured to:
   determine a first mismatch between the second training upstream signal and the first echoed second training upstream signal;
   recursively estimate filter coefficients for the first set of ACI filters until the first mismatch satisfies a threshold amount of mismatch; and
   enable use of the first set of ACI filters.

3. The access device of claim 2, wherein during the training phase, the access device is configured to:
   determine a second mismatch between the second training upstream signal and the first echoed second training upstream signal;
   recursively estimate filter coefficients for the second set of ACI filters until the second mismatch satisfies the threshold amount of mismatch; and
   enable use of the second set of ACI filters.

4. The access device of claim 2, wherein during the training phase, the access device is configured to:
   receive the first signals and the second signals;
   determine a mismatch between the first signals and the second signals;
   recursively estimate filter coefficients for the set of ALI filters until the mismatch satisfies the threshold amount of mismatch; and
   enable use of the set of ALI filters.

5. The access device of claim 1, wherein the ALI signal is operable to reduce effects of ALI at the first receiver component, the first ACI signal is operable to reduce ACI from the feedback path, and the second ACI signal is operable to reduce ACI from the downstream signal.

6. The access device of claim 1, wherein the access device includes a set of digital transmitter components, and wherein a number of digital transmitter components of the set of digital transmitter components is equal to a number of filters in the first set of ACI filters.

7. The access device of claim 1, wherein the transmit path further includes:
   a modulation component configured to perform at least one modulation technique on the upstream signal; and
   a combiner coupled to an output of the modulation component, the combiner configured to up-convert the upstream signal according to a frequency assignment.

8. A system, comprising:
   a directional coupler configured to pass an upstream signal and receive a downstream signal on an upstream channel and a downstream channel that are adjacent;
   a transmit path that includes a digital transmitter component configured to transmit the upstream signal;
   a receive path that includes a first receiver component and a first subtraction component;
   a feedback path for processing a sampled echoed transmit signal obtained from the transmit path, the feedback path comprising a set of adjacent leakage interference (ALI) filters, the feedback path operable to generate an ALI signal that is received at the first receiver component associated with the receive path to reduce effects of ALI at the first receiver component associated with the receive path, the feedback path comprising a second receiver component, a second subtraction component, and a training component configured to train the set of ALI filters by obtaining and processing first signals from the receive path and second signals from the feedback path while the receive path and the feedback path are operating on a channel associated with downstream reception and a first training upstream signal is transmitted on a channel associated with the downstream channel on the transmit path, and estimating filter coefficients for the set of ALI filters;

a first echo cancellation path for the feedback path being configured to generate a first adjacent channel interference (ACI) signal received at the second subtraction component associated with the feedback path, the first ACI signal determined by processing a sampled upstream signal associated with the transmit path using a first set of ACI filters at the first echo cancellation path, the first set of ACI filters being trained by processing both a second training upstream signal and receiving and processing a first echoed second training upstream signal for the upstream channel from the directional coupler on the feedback path operating on a channel associated with upstream transmission; and a second echo cancellation path for the receive path being configured to generate a second ACI signal received at the first subtraction component associated with the receive path, the second ACI signal obtained by processing the sampled upstream signal associated with the transmit path using a second set of ACI filters at the second echo cancellation path, the second set of ACI filters being trained by processing both the second training upstream signal and receiving and processing a second echoed second training upstream signal for the upstream channel from the directional coupler on the receive path operating on the channel associated with upstream transmission, wherein the transmit path, receive path, first echo cancellation path, and second echo cancellation path are coupled to the directional coupler, and wherein filter coefficients for the first set of ACI filters and the second set of ACI filters is estimated before estimating the filter coefficients for the set of ALI filters.

9. The system of claim 8, wherein the feedback path further includes at least one of a switch component, an automatic gain control (AGC) component, an analog-to-digital-converter (ADC) component, a feedback channelizer component, or an OFDM partial demodulator component, and wherein the receive path further includes at least one of an AGC component, an ADC component, a receiver channelizer, or a demodulation component.

10. The system of claim 8, wherein the first echo cancellation path further includes an ADC component.

11. The system of claim 8, wherein the second echo cancellation path further includes an ADC component.

12. The system of claim 8, wherein the ALI signal is operable to reduce effects of ALI at the first receiver component, the first ACI signal is operable to reduce ACI from the feedback path, and the second ACI signal is operable to reduce ACI from the downstream signal.

13. The system of claim 8, wherein the system further includes a set of digital transmitter components, and wherein a number of digital transmitter components of the set of digital transmitter components is equal to a number of filters in the first set of ACI filters.

14. The system of claim 8, wherein the transmit path further includes:

a modulation component configured to perform at least one modulation technique on the upstream signal; and a combiner coupled to an output of the modulation component, the combiner configured to up-convert the upstream signal according to a frequency assignment.

15. A method, comprising:

enabling a directional coupler configured to transmit an upstream signal transmitted by a digital transmitter component associated with a transmit path, and receive a downstream signal on an upstream channel and a downstream channel that are adjacent;

using a first training component to train a set of adjacent leakage interference (ALI) filters by processing first signals from a receive path and second signals from a feedback path while the receive path and the feedback path operate on a channel associated with downstream reception and a first training upstream signal is transmitted on the channel associated with the downstream channel on the transmit path, wherein the receive path includes a first receiver component and a first subtraction component, and wherein the feedback path includes the set of adjacent leakage interference (ALI) filters, the feedback path operable to generate an ALI signal that is received at the first receiver component associated with the receive path to reduce effects of ALI at the first receiver component associated with the receive path, the feedback path comprising a second receiver component, a second subtraction component, and the first training component;

enabling a first echo cancellation path for the feedback path that includes a first set of adjacent channel interference (ACI) filters;

generating a first ACI signal by processing a sampled upstream signal associated with the transmit path using the first set of ACI filters;

using a second training component to train the first set of ACI filters by processing both a second training upstream signal and receiving and processing a first echoed second training upstream signal for the upstream channel from the directional coupler on the feedback path operating on a channel associated with upstream transmission;

enabling a second echo cancellation path for the receive path that includes a second set of ACI filters;

generating a second ACI signal by processing the sampled upstream signal using the second set of ACI filters; and using the second training component to train the second set of ACI filters by processing both the second training upstream signal and receiving and processing a second echoed second training upstream signal for the upstream channel from the directional coupler on the receive path operating on the channel associated with upstream transmission, wherein filter coefficients for the first set of ACI filters and the second set of ACI filters is estimated before estimating filter coefficients for the set of ALI filters.

16. The method of claim 15, wherein the set of ALI filters is configured to generate the ALI signal, the ALI signal operable to reduce effects of ALI.

17. The method of claim 15, further comprising: wherein the first set of ACI filters is being configured to generate the first ACI signal, the first ACI signal operable to reduce effects of ACI.

* * * * *